United States Patent
Pan et al.

(10) Patent No.: US 10,843,428 B2
(45) Date of Patent: Nov. 24, 2020

(54) METHODS AND APPARATUS FOR INSTALLING A TREAD RING UPON A TIRE CARCASS

(71) Applicant: Compagnie Generale des Etablissements Michelin, Clermont-Ferrand (FR)

(72) Inventors: Chinglin Pan, Mauldin, SC (US); Michael D. Petrovich, Simpsonville, SC (US); John E. Hommerson, Greenville, SC (US); David Chan Wah Lung, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 576 days.

(21) Appl. No.: 15/681,986

(22) Filed: Aug. 21, 2017

(65) Prior Publication Data
US 2017/0348934 A1    Dec. 7, 2017

Related U.S. Application Data

(62) Division of application No. 14/129,835, filed as application No. PCT/US2011/058683 on Oct. 31, 2011, now Pat. No. 9,757,916.
(Continued)

(51) Int. Cl.
| B29D 30/58 | (2006.01) |
| B29D 30/26 | (2006.01) |
| B29D 30/52 | (2006.01) |

(52) U.S. Cl.
CPC ......... B29D 30/58 (2013.01); B29D 30/2607 (2013.01); *B29D 2030/523* (2013.01); *B29D 2030/585* (2013.01)

(58) Field of Classification Search
CPC .............. B29D 30/0629; B29D 30/063; B29D 30/1614; B29D 30/26; B29D 30/2607;
(Continued)

(56) References Cited

U.S. PATENT DOCUMENTS

| 1,622,546 A | 3/1927 | Seiberling |
| 2,014,010 A | 9/1935 | Wheatley |

(Continued)

FOREIGN PATENT DOCUMENTS

| CA | 1208111 A | 7/1986 |
| CN | 1112875 A | 12/1995 |

(Continued)

OTHER PUBLICATIONS

PCT/US2011/058683 International Search Report and Written Opinion dated Mar. 19, 2012, 11 pages.
(Continued)

*Primary Examiner* — Robert C Dye
*Assistant Examiner* — Sedef E Paquette
(74) *Attorney, Agent, or Firm* — Hahn Loeser & Parks LLP; Bret A. Hrivnak

(57) ABSTRACT

Exemplary embodiments of the subject invention comprise methods and apparatus for mounting a tread ring onto a tire carcass. Such methods include providing a tire tread ring having opposing side edges, arranging the tread ring in an initial ring arrangement in communication with a pressure source, and expanding the tread ring radially outward from the initial ring arrangement to an expanded arrangement. The pressure source is in communication with an outer side of the tread ring, the tread ring being expanded by applying vacuum pressure along the outer side of the tread ring supplied by the pressure source. Such methods also include inserting a tire carcass within a central opening of the tread ring while in the expanded arrangement, contracting the tread ring into an installed arrangement about an outer surface of the tire carcass, and, releasing the vacuum along the outer side of the tread ring.

11 Claims, 13 Drawing Sheets

Related U.S. Application Data

(60) Provisional application No. 61/503,437, filed on Jun. 30, 2011.

(58) Field of Classification Search
CPC .... B29D 30/3014; B29D 30/52; B29D 30/58; B29D 2030/0088; B29D 2030/062; B29D 2030/0621; B29D 2030/0622; B29D 2030/0623; B29D 2030/0625; B29D 2030/0626; B29D 2030/0627; B29D 2030/0631; B29D 2030/088; B29D 2030/2692; B29D 2030/3207; B29D 2030/3221; B29D 2030/3242; B29D 2030/325; B29D 2030/3257; B29D 2030/3264; B29D 2030/4493; B29D 2030/523; B29D 2030/585; B29D 2030/587
USPC ...... 156/126, 127, 128.1, 128.6, 129, 406.2, 156/406.6; 425/25, 46
See application file for complete search history.

(56) References Cited

U.S. PATENT DOCUMENTS

| | | |
|---|---|---|
| 2,282,580 A | 5/1942 | Hawkinson |
| 2,292,286 A | 8/1942 | Owen |
| 3,100,731 A | 8/1963 | Brey |
| 3,149,658 A | 9/1964 | Wolfe |
| 3,212,951 A | 10/1965 | Porter |
| 3,224,481 A | 12/1965 | Lugli |
| 3,326,261 A | 6/1967 | Young |
| 3,400,030 A | 9/1968 | Burger |
| 3,815,651 A | 6/1974 | Neal |
| 3,881,983 A | 5/1975 | Smith |
| 3,883,382 A | 5/1975 | Pelletier |
| 3,945,871 A | 3/1976 | Schelkmann |
| 3,963,393 A | 6/1976 | Barefoot |
| 3,976,532 A | 8/1976 | Barefoot |
| 3,983,193 A | 9/1976 | Wulker et al. |
| 3,994,653 A | 11/1976 | Marangoni |
| 4,033,395 A | 7/1977 | Berg et al. |
| 4,036,677 A | 7/1977 | Marangoni |
| 4,082,592 A | 4/1978 | Raabe et al. |
| 4,088,521 A | 5/1978 | Neal |
| 4,093,481 A | 6/1978 | Schelkmann |
| 4,105,482 A | 8/1978 | Wapelhorst et al. |
| 4,147,642 A | 4/1979 | Schelkmann |
| 4,173,509 A | 11/1979 | Raabe et al. |
| 4,178,198 A | 12/1979 | Kent |
| 4,211,594 A | 7/1980 | Freitag et al. |
| 4,230,511 A | 10/1980 | Olsen |
| 4,234,371 A | 11/1980 | Christman |
| 4,240,851 A | 12/1980 | King |
| 4,290,376 A | 9/1981 | Brusasca et al. |
| 4,473,427 A | 9/1984 | Irie |
| 4,588,460 A | 5/1986 | Magee et al. |
| 4,626,300 A | 12/1986 | Barefoot |
| 4,708,840 A | 11/1987 | McGlashen |
| 4,765,862 A | 8/1988 | Azuma |
| 4,792,379 A | 12/1988 | Magee et al. |
| 4,909,873 A | 3/1990 | Detwiler |
| 4,946,554 A | 8/1990 | Magee et al. |
| 4,954,205 A | 9/1990 | Agawa |
| 4,957,574 A | 9/1990 | Clayton et al. |
| 4,957,575 A | 9/1990 | Cronin |
| 5,071,498 A | 12/1991 | Nishiide et al. |
| 5,104,600 A | 4/1992 | Remond |
| 5,156,713 A | 10/1992 | Ishii et al. |
| 5,290,376 A | 3/1994 | Siegenthaler |
| 5,346,663 A | 9/1994 | Siegenthaler |
| 5,354,406 A | 10/1994 | King et al. |
| 5,380,383 A | 1/1995 | Chlebina et al. |
| 5,425,835 A | 6/1995 | Chlebina et al. |
| 5,486,260 A | 1/1996 | Garmy et al. |
| 5,536,348 A | 7/1996 | Chlebina et al. |
| 5,690,776 A | 11/1997 | Anderson |
| 5,709,768 A | 1/1998 | Byerley |
| 5,769,975 A | 6/1998 | Keys |
| 5,814,263 A | 9/1998 | Pouille et al. |
| 5,827,380 A | 10/1998 | Chlebina et al. |
| 5,944,925 A | 8/1999 | Courel et al. |
| 6,080,256 A | 6/2000 | Suzuki et al. |
| 6,089,290 A | 7/2000 | Chlebina et al. |
| 6,264,779 B1 | 7/2001 | Cappelli et al. |
| 6,270,602 B1 | 8/2001 | Johnston et al. |
| 6,290,810 B1 | 9/2001 | Yovichin et al. |
| 6,521,071 B2 | 2/2003 | Parrish et al. |
| 7,001,163 B2 | 2/2006 | McBride et al. |
| 7,189,069 B2 | 3/2007 | Yovichin et al. |
| 7,208,061 B2 | 4/2007 | Nakata et al. |
| 7,914,642 B2 | 3/2011 | Grohmann et al. |
| 2002/0129887 A1 | 9/2002 | Majumdar et al. |
| 2003/0194458 A1 | 10/2003 | Bailey et al. |
| 2004/0118513 A1 | 6/2004 | Dyrlund et al. |
| 2004/0191346 A1 | 9/2004 | Marangoni et al. |
| 2004/0261934 A1 | 12/2004 | Nakata et al. |
| 2006/0055082 A1 | 3/2006 | Kudo et al. |
| 2006/0151916 A1* | 7/2006 | Vannan ............ B60C 15/04 264/328.3 |
| 2009/0226702 A1 | 9/2009 | Madsen et al. |

FOREIGN PATENT DOCUMENTS

| | | |
|---|---|---|
| CN | 201257760 Y | 6/2009 |
| CN | 101665005 A | 3/2010 |
| CN | 101665006 A | 3/2010 |
| DE | 1232845 B | 1/1967 |
| DE | 1268373 B | 5/1968 |
| DE | 2420329 A1 | 11/1975 |
| DE | 2544744 A1 | 4/1977 |
| DE | 2420329 B2 | 9/1980 |
| EP | 0108723 A1 | 5/1984 |
| EP | 0176945 A1 | 4/1986 |
| EP | 0345201 A2 | 12/1989 |
| EP | 0464660 A1 | 1/1992 |
| EP | 0630740 A1 | 12/1994 |
| EP | 0780218 A1 | 6/1997 |
| EP | 1097951 A2 | 5/2001 |
| EP | 1260351 A3 | 1/2003 |
| EP | 1433592 A2 | 6/2004 |
| EP | 1447197 A2 | 8/2004 |
| EP | 1514675 A2 | 3/2005 |
| EP | 1743758 A2 | 1/2007 |
| GB | 910715 A | 11/1962 |
| GB | 988837 A | 4/1965 |
| GB | 1032746 A | 6/1966 |
| GB | 1389421 A | 4/1975 |
| GB | 1399864 A | 7/1975 |
| GB | 1460297 A | 12/1976 |
| GB | 1507522 A | 4/1978 |
| GB | 1552841 A | 9/1979 |
| IN | 191271 A1 | 10/2003 |
| JP | 49-103967 A | 10/1974 |
| JP | 02-179731 A | 7/1990 |
| JP | 04-288222 A | 10/1992 |
| JP | 07-016950 A | 1/1995 |
| JP | 07-276934 A | 10/1995 |
| JP | 3633956 B2 | 3/2005 |
| JP | 2006-346930 A | 12/2006 |
| JP | 2010-167672 A | 8/2010 |
| WO | 9208603 A1 | 5/1992 |
| WO | 4589065 B2 | 11/2010 |
| WO | 2010131588 A1 | 11/2010 |

OTHER PUBLICATIONS

T&A Tyre Press, Marangoni Launches Ringbuilder 3000, May 31, 2007, 1 page.
T&A Tyre Press, Latest Ringtread Technology Shown off at Opening of New Plant, Jun. 4, 2007, 1 page.
T&A Tyre Press, Marangoni Ready to Move Forward, Nov. 29, 2007, 2 pages.

(56) References Cited

OTHER PUBLICATIONS

T&A Tyre Press, Marangoni Unveils Ring Modular System, Nov. 2, 2007, 2 pages.
T&A Tyre Press, Second Plant for Ringtread System, Nov. 30, 2001, 1 page.
T&A Tyre Press, Changes in Retreading Forcing Independents to Adapt, Mar. 12, 2007, 3 pages.

* cited by examiner

_US 10,843,428 B2_

METHODS AND APPARATUS FOR INSTALLING A TREAD RING UPON A TIRE CARCASS

This application claims priority to, and the benefit of, U.S. patent application Ser. No. 14/129,835, filed Dec. 27, 2013 with the United States Patent Office, which is a national phase entry of International Patent Application No. PCT/US2011/058683, filed Oct. 31, 2011 with the United States Patent Office (acting as the US Receiving Office), which claims priority to, and the benefit of, U.S. Provisional Patent Application No. 61/503,437 filed Jun. 30, 2011 with the United States Patent Office, all of which are hereby incorporated by reference.

BACKGROUND OF THE INVENTION

Field of the Invention

This invention relates generally to methods and apparatus for mounting a tread ring onto a tire carcass or casing.

Description of the Related Art

It is known to mount treads onto buffed tire casings during tire retread operations. For example, tread strips may be wrapped around a tire carcass until the tread ends generally meet at a joint, whereby elastomeric joining material is applied to fill any gap between the opposing terminal ends. The terminal ends may be stapled to retain the arrangement. This often results in an uneven, aesthetically unpleasing joint.

By further example, a tread ring may be expanded by a plurality of fingers spaced about the tread ring's underside. The tread ring is expanded beyond the outside diameter of the tire carcass, the expanded tread ring generally forming a polygon representing the finger arrangement. After elastomeric joining material is arranged between the tread ring and the tire carcass, air cylinders then force the tread ring onto the tire carcass. The fingers are then removed laterally from the retreaded tire carcass. The existence of fingers arranged between the tread ring and the tire carcass and the localized stretching arising therefrom can cause localized abnormalities, such as localized alterations to the tread ring and discontinuous application or presence of joining material along the underside of the tread. Such abnormalities may hinder tire quality and performance.

Another exemplary process for mounting a tread ring utilizes centrifugal forces to expand the tread ring during a spinning operation. Once the tread ring expands, the tire carcass is inserted centrally. Thereafter, the rotational speed of the tread ring is slowed until the tire is mounted onto a carcass spinning at a similar speed such that there is little if any relative rotation between the tread ring underside and the outer surface of the tire carcass. Because there are imbalances inherent in each of the tread ring and the tire carcass, rotation of each produces inexact shapes as the imbalances act upon each rotational body, which results in a less-than perfect assembly and interface between non-symmetrical components.

In yet another exemplary process, an uncured (i.e., green) tread is arranged about a buffed tire casing and subsequently put into an annular mold to cure. This method is very expensive, whereby a specific mold is generally required for each tread design or sculpture. Such methods generally produce a lower volume of retreaded tires in comparison to other methods.

Accordingly, there is a need to provide improved methods and apparatus for mounting a tread ring onto a tire carcass.

SUMMARY OF THE INVENTION

Particular embodiments of the present invention include methods and apparatus for mounting a tread ring onto a tire carcass. Particular embodiments of such apparatus include a tread ring expansion assembly having a tread ring-receiving cavity configured to receive a tread ring and a tire carcass-receiving cavity configured to receive a tire carcass, the tire carcass-receiving cavity arranged radially inward the tread ring-receiving cavity. The assembly further includes a plurality of tread expanding members having tread receiving surfaces, the tread expanding members being arranged in an annular arrangement radially outward the tread ring-retaining cavity and configured to translate in a radial direction relative to the tread ring-retaining cavity between tread engaging and tread expanding arrangements, the tread receiving surfaces being arranged in fluid communication with a vacuum pressure source. The expansion assembly further includes a first side wall and a second side wall arranged annularly on opposing sides of the plurality of tread expanding members and the tread ring-receiving cavity, the side walls extending radially relative to the tread ring-receiving cavity and being configured to engage the side edges of a tread ring when arranged within the tread ring-receiving cavity. The apparatus also includes means for translating the plurality of tread expanding members between the tread engaging and tread expanding arrangements.

Particular embodiments of such methods include a method for mounting a ring tread onto a tire carcass include the step of providing a tire tread ring comprising a tire tread having a radial thickness and lateral width extending between opposing side edges, the tread extending lengthwise to form a closed loop. Further steps may include arranging the tread ring in an initial ring arrangement in communication with a pressure source, the pressure source being in communication with an outer side of the tread ring. Yet further steps may include expanding the tread ring radially outward from the initial ring arrangement to an expanded arrangement, the tread ring being expanded by applying vacuum pressure along the outer side of the tread ring supplied by the pressure source. Such methods may further include the step of inserting a tire carcass within a central opening of the tread ring while in the expanded arrangement. The methods may include contracting the tread ring into an installed arrangement about an outer surface of the tire carcass and releasing the vacuum along the outer side of the tread ring.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
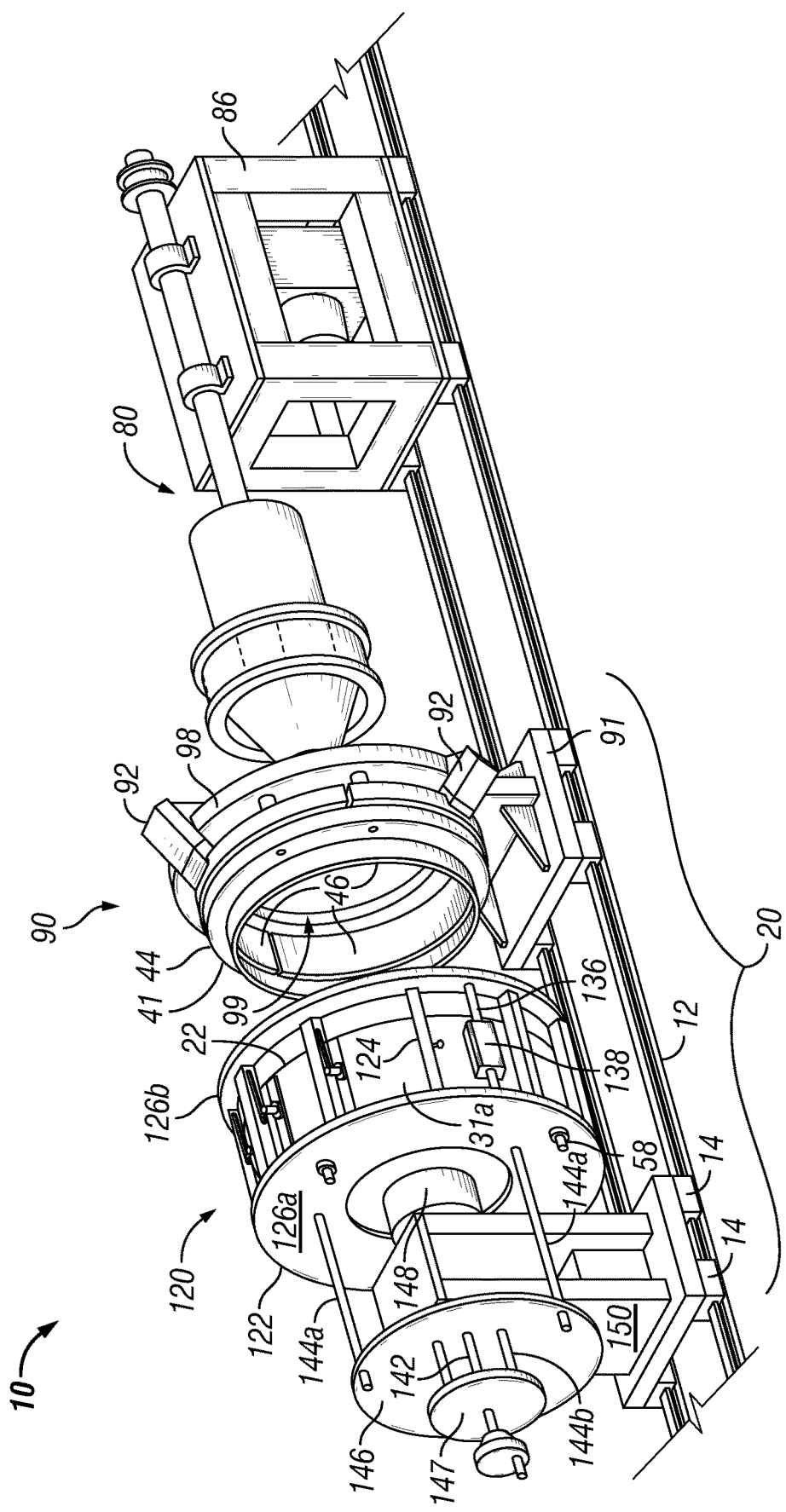
FIG. 1 is a perspective view of a tread ring installation device according to an exemplary embodiment of the invention.

The present invention includes a tread ring installation device and methods for installing a tread ring onto a tire casing. In tire retreading operations, tread rings are applied to a pre-existing, cured tire casing after the old tread has been removed there from. It is understood, however, that the present invention may be used to install or apply a tread ring onto any cured or uncured tire carcass, such as during new tire manufacturing operations.

Methods of mounting or applying a tread ring onto a tire carcass may comprise a variety of steps. In particular embodiments, such methods include the step of providing a tire tread ring comprising a tire tread having a radial thickness and lateral width extending between opposing side edges, the tread extending lengthwise to form a closed loop. It is known that tires have a tread extending annularly there about. In the present step, a tread in the form of a tread ring is provided. The tire tread may comprise any desired tire tread of any design associated with any tire type. The tread is formed of any known elastomeric material, such as natural and/or synthetic rubber or polymeric material that is curable with the application of heat or more generally by vulcanization. The tread structure generally includes an outer side and an inner side, the tread thickness extending between the outer and inner sides. Opposing side edges (also referred to as "lateral side edges") are arranged on opposing sides of a width of the tread, the tread width extending laterally in a direction perpendicular to both the tread thickness and a lengthwise direction of the tread. The width of the tread generally remains constant or narrows from the inner side to the outer side. Accordingly, the width of the tread ring outer side is less than or equal to the width of the tread ring inner side. The outer side of the tread generally forms a ground-engaging side of the tread, which may or may not include a patterned arrangement of tread features. Tread features may comprise grooves, sipes, and other voids associated with ground-engaging ribs and or lugs. The inner side of the tread is configured for attachment to an outer surface of the tire carcass.

The tread and tread ring may be formed according to any known process. For example, the tread may be flat molded or extruded and cut to length as necessary. Thereafter, opposing terminal ends are joined to form a unitary, continuous ring. By further example, the tread may be molded into the shape of a unitary, continuous ring. The outer side of the tread generally forms the outer side of the tread ring, while the inner side of the tread forms the inner side of the tread ring. The tread ring may be provided in an uncured, cured, or at least partially cured state or condition.

The method of mounting a tread ring onto a tire carcass may further comprise the step of arranging the tread ring in an initial ring arrangement in communication with a pressure source, the pressure source being in communication with an outer side of the tread ring. To prepare the tread ring for expansion, the ring is arranged in an initial ring arrangement, whereby the outer side of the tread ring is in communication with a pressure source capable of providing vacuum pressure to facilitate expansion of the tread ring in accordance with further steps. This includes arranging the ring adjacent a pressure source or placing the tread ring adjacent a pressurization chamber that is in communication with a pressure source. In the later arrangement, the tread ring may form a boundary of the pressurization chamber, where the outer side and/or the lateral side edges of the tread ring are in communication with the pressurization chamber and may contact structure associated with the pressurization chamber to generally seal the chamber. Accordingly, particular embodiments of the step of arranging the tread ring in an initial ring arrangement includes engaging each side edge with a side wall of an annular pressurization chamber, the side walls being spaced apart by a variable distance and the pressurization chamber being arranged along the outer side of the tread ring and being in communication with the vacuum pressure supplied by the pressure source. In such embodiments, the tread side edges are arranged to engage a corresponding side wall to create a seal between the tread and the pressurization chamber. In particular instances, the tread width may narrow as the tread ring expands. Accordingly, the side walls may be spaced apart by a distance that narrows as the each side wall extends radially outward relative the tread receiving cavity and the rotational axis of the tread ring.

It is understood that the side walls may be fixed or at least a portion thereof may be displaceable. Displaceable connotes a side wall that is deformable, collapsible, or expandable, or a side wall that is translatable. In certain embodiments, a radially inward portion of at least one of the side walls is displaceable away from the tread ring, such as in an axial direction, and engages a corresponding tread ring side edge when the tread ring is arranged in the initial ring arrangement. Further, after the tread ring is expanded in the step of expanding, the radially inward portion of the side wall is displaced, such as in an axial direction, away from the tread ring area to provide clearance for receiving the tire carcass in the step of inserting the tire carcass within the central opening of the expanded tread ring. The radially inward portion may comprise a translatable ring, which may expand in both a radial and axial direction relative the tread ring. Translatable and expandable rings are described more fully below in association with the figures.

In addition to, or in lieu of, engaging the side edges of the tread ring with a side wall, the step of arranging may include engaging the outer side of the tread ring with a tread receiving surface of a tread expanding member, the tread receiving surface being in communication with the vacuum pressure supplied by the pressure source and being translatable in a radial direction to facilitate expansion and contraction of the tread ring. This tread ring-receiving surface may be configured to engage the tread ring outer side to facilitate radial expansion of the tread ring under vacuum pressure. The tread ring-receiving surface is generally in fluid communication with the vacuum pressure. For example, one or more fluid passages in communication with a pressure source may be arranged in association with a tread ring-receiving surface. Such passages may extend about a side edge of the tread ring-receiving surface or through such surface. In certain embodiments, the step of arranging includes inserting the tread ring into a tread ring-receiving cavity of a tread ring-expansion assembly (or "tread expansion assembly") described more fully below in association with the figures. Translation of the tread receiving surface may be achieved by any known means for translating or expanding and contracting. Examples are described further below in association with the tread expansion assembly and the figures.

The method of mounting a tread ring onto a tire carcass may further comprise the step of expanding the tread ring radially outward from the initial ring arrangement to an expanded arrangement, the tread ring being expanded by applying vacuum pressure along the outer side of the tread ring supplied by the pressure source. As discussed above, vacuum pressure facilitates expansion of the tread ring from an unexpanded arrangement to an expanded arrangement, where the outer diameter of the ring in the expanded arrangement is larger than the outer diameter of the ring in the unexpanded arrangement. In operation, vacuum pressure operates along an outer side of the tread ring to expand the tread ring outwardly in a radial direction. Such tread ring may be engaged with one or more structures to assist in the expansion of the tread ring with the concurrent application of vacuum pressure. In particular embodiments, where the tread ring outer side is in engagement with the tread receiving surface of a tread expanding member, the tread ring expands radially with the radially translating tread expanding member, the member and tread ring remaining in contact (i.e., engaged) due to the application of vacuum pressure. In further embodiments, where the tread ring side edges each engage a side wall, the step of expanding the tread ring includes sliding each tread ring side edge along the corresponding side wall of the pressurization chamber, wherein the variable distance between the side walls decreases as the tread ring expands. As the tread ring expands, the width of the tread ring may narrow. In such situations, at least one of the side walls (or both) may taper inwardly (axially inward relative the tread ring) as the tread ring expands to decrease the distance between the opposing side walls and maintain tread edge contact as the tread narrows in width. In other variations, at least one of the side walls (or both) may translate axially inward as the tread ring expands to decrease the distance between the opposing side walls and maintain tread edge contact.

The method of mounting a tread ring onto a tire carcass may further comprise the step of arranging a joining material between the tread ring and the tire carcass. To attach the tread ring to the tire carcass, joining material may be arranged between the tread and carcass. The joining material may be placed along an outer side of the tire carcass and/or along the inner side of the tread ring (i.e., underside of the tread), which is the tread surface facing the tire carcass. Application to the inner side of the tread ring may occur when the tread ring is in an expanded state, but may also occur when in an unexpanded state. Such application may be performed by extending a means for applying the joining material onto the tread, such as a joining material applicator. For example, such means may apply the joining material by spray or as a film having a desired length, width, and thickness. The joining material may comprise any known material for joining the tread to the carcass. For example, the joining material may comprise a curable elastomeric material or an adhesive. The joining material may also be curable, such as by application of heat, to achieve vulcanization. It is also understood that any device, apparatus, or mechanism may be inserted into (and removed from) the central cavity of the expanded or unexpanded tread ring (and any tread expansion assembly within which the tread ring is retained) before any tire carcass is received therein to achieve a desired purpose. For example, such device, apparatus, or mechanism may comprise a means for applying heat to the joining material and/or tread ring or for preparing the inner side of the tread for receiving joining material or for attachment to the tire carcass, such as to score (lacerate) or abrade the inner side of the tread ring to improve adhesion.

The method of mounting a tread ring onto a tire carcass may further comprise the step of inserting or arranging a tire carcass within a central opening of the tread ring while in the expanded arrangement. A tire carcass can be described as having the shape of a torus having a central opening concentric with a rotational axis of the tire, whereby an outer diameter of the torus is arranged along an annular surface to form the tread-engaging surface. In arranging the tire carcass within the tread ring, the inner side of the tread ring may be arranged adjacent the tread-mounting surface of the tire carcass and the rotational axes of the tread ring and the tire carcass arranged coaxially. It is understood that the step of inserting or arranging may be accomplished by translating either or both of the tread ring and tire carcass relative to the other to achieve the desired arrangement. Translation is defined to include linear and non-linear movement, such as rotational movement.

The method of mounting a tread ring onto a tire carcass may further comprise the step of contracting the tread ring into an installed arrangement about an outer surface of the tire carcass. Once the expanded tread ring is properly positioned relative the tire carcass, the tread ring contracts until reaching an installed arrangement upon the tire carcass. Contraction of the tread ring may be achieved by releasing the vacuum and/or by translating any structure used to expand the tread ring radially inward toward the tire carcass. Such structure may comprise the tread expanding members. Quite simply, contraction may occur by generally reversing the process employed to expand the tread ring according to prior steps. Contraction generally continues until the tread ring is mounted or arranged onto the tire carcass in an installed arrangement.

The method of mounting a tread ring onto a tire carcass may further comprise the step of forcefully applying the contracted tread ring onto the tire carcass. Even though the tread ring may contract to form a smaller ring, it may be arranged to contract to its original, unexpanded arrangement, where in such arrangement the ring is generally in equilibrium and does not apply any further pressure against the carcass. However, the contact or engagement between the tread ring and the tire carcass may be improved by forcefully applying the contracted tread ring onto the tire casing. This may be achieved by any known means. For example, forceful application of the tread ring may include positively pressurizing the pressurization chamber with non-vacuum pressure after the vacuum pressure is released. In yet another example, forceful application may be achieved by translating each tread ring-expanding member further toward the tire carcass to apply compressive forces upon the tread ring. Further, the carcass may be further pressurized in an attempt to expand the tire carcass radially outwardly to apply additional forces against the tread ring. Even further, the assembled retreaded tire may be arranged within an envelope to form a pressurization compartment between the tire and the envelope. The envelope with tire may be placed into pressurization chamber of an autoclave, where the pressurization compartment of the envelope is placed under vacuum pressure and the pressurization chamber of the autoclave is pressurized to forcefully apply the tread to the tire carcass.

The method of mounting a tread ring onto a tire carcass may further comprise the step of releasing the vacuum along the outer side of the tread ring. After the tread ring has been arranged along the tire carcass, the vacuum pressure is released or terminated to facilitate removal of the treaded or assembled tire. The vacuum is released by pressurizing the chamber to atmospheric pressure or any other non-vacuum pressure desired. This may be achieved by any known means. As discussed above, releasing the vacuum may be performed as part of the step of contracting the tread ring into an installed arrangement about an outer surface of the tire carcass.

A further step of the method of mounting a tread ring onto a tire carcass may comprise at least partially curing joining material arranged between the tread ring and the tire carcass. After applying the tread ring onto the tire carcass with joining material arranged there between, according to particular embodiments, the joining material may be partially or substantially cured. Such partial or substantial curing may be performed before or after removing the treaded tire carcass from any apparatus in which it is formed, and may be achieved by applying heat to the joining material using any known means for heating the joint material. Means for heating may be achieved through conduction, convection, or radiation. For example, the means for heating may comprise one or more heating elements spaced about the inner and/or outer side of the tread ring and/or tire carcass. Such heating elements may be arranged in the tread expanding member or may be arranged in a separate member outside the tread expansion assembly. Even further, a heating blanket, a hot air gun, a heat lamp, or an infrared lamp may be employed. After assembly of the retreaded tire, such tire may be arranged in a heating chamber wherein the means for heating is arranged.

These methods for mounting or applying a tread ring onto a tire carcass may be achieved manually or automatically, in whole or in part. Exemplary embodiments of a tread ring installation device for use in performing such methods are discussed in further detail below. The device(s) shown in the figures are only exemplary of any of a variety of ring tread mounting devices that may be employed within the scope of this invention.

Figure 2:
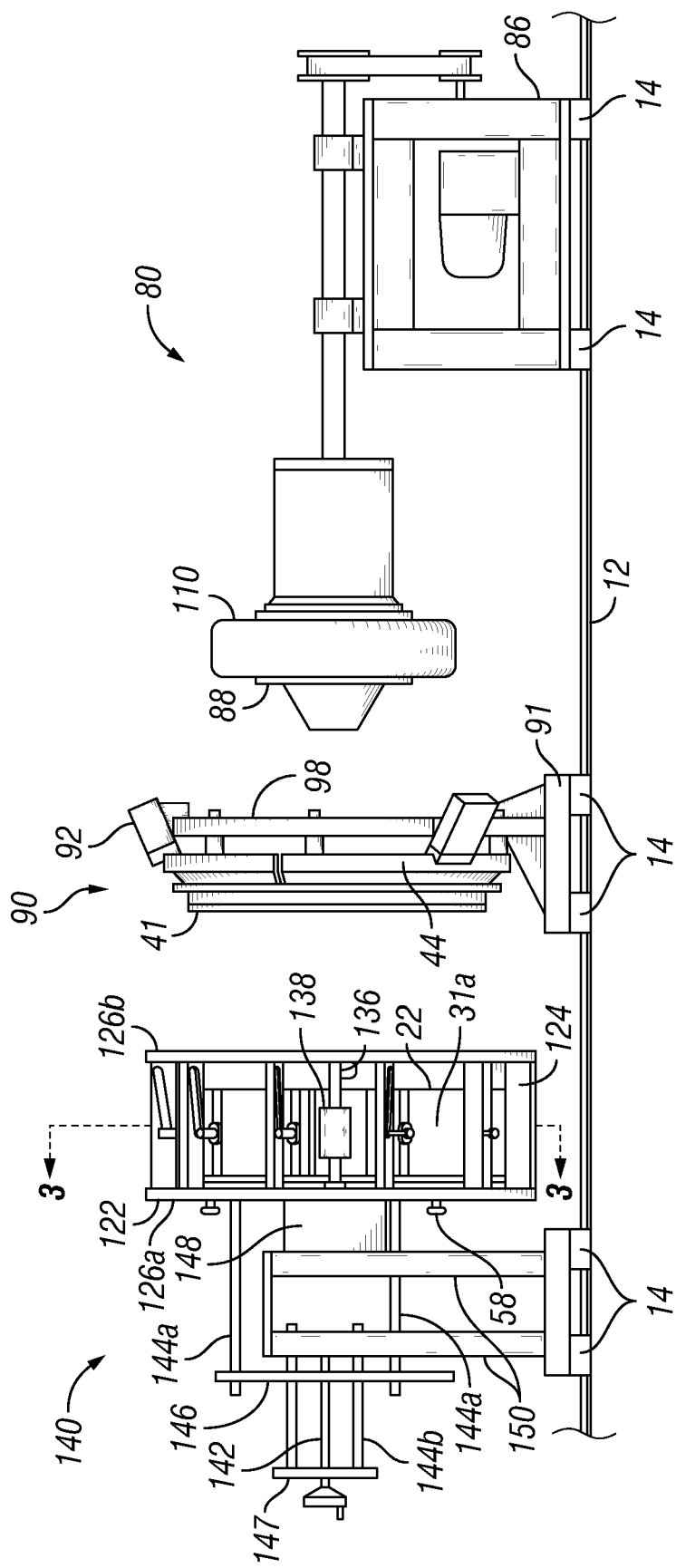
FIG. 2 is a side elevational view of the tread ring installation device of FIG. 1, showing a tire carcass mounted along a tire carcass-retention structure according to an exemplary embodiment of the invention.

With reference to FIGS. 1-2, a tread ring installation device 10 is shown for mounting a tread ring onto a tire carcass. Device or system 10 generally includes a tread ring expansion assembly 20 for receiving, expanding, and mounting a tread ring 100 onto a tire carcass 110 (exemplarily shown in FIGS. 8-10). Device 10 further includes a tire carcass-retaining structure 80 for retaining the tire carcass 110 in a desired arrangement.

To properly mount a tread ring 100 onto the tire carcass 110, the tread ring expansion assembly 20 and the tire carcass-retaining structure 80 are configured to place the tire carcass 110 within a central opening of the tread ring 100 while the tread ring is in an expanded arrangement. Once the tire carcass is arranged within the expanded tread ring, the ring is contracted onto the centrally located tire carcass to form an assembled retreaded tire (or a "treaded tire carcass"). In particular embodiments, at least one of the tread ring expansion assembly 20 and the carcass-retaining structure 80 translate. Specifically, tread ring expansion assembly 20 and carcass-retaining structure 80 translate between a separated arrangement and the tread mounting arrangement. While in the separated arrangement, a tread ring 100 may be placed within the tread ring expansion assembly 20 and a tire carcass 110 may be placed within the carcass-retaining structure 80 prior to tire assembly, and an assembled tire may be removed from tread ring installation device 10 subsequent to tire assembly. In the arrangement shown, the carcass-retaining structure 80 translates along track 12 with guides 14. Translation may be achieved using any known means for translating, such as by a hydraulic or pneumatic cylinder, linear drive, or motor in communication with a belt, gear, or chain drive, for example.

The tread ring expansion assembly 20 is configured to receive a tread ring in an unexpanded ring arrangement and subsequently expand the tread ring under vacuum pressure into an expanded ring arrangement. Once expanded, the tread ring is arranged about a tire carcass and upon which the tread ring is contracted into an installed arrangement. With reference FIGS. 3-4, the tread ring expansion assembly 20 includes a ring receiving unit 22 having a central annular tread ring-receiving cavity 23a and a pressurization chamber 30 arranged radially outward the annular tread-receiving cavity 23a. Pressurization chamber 30 is also in fluid communication with tread ring-receiving cavity 23a.

One or more pressure sources (not shown) are arranged in communication with pressurization chamber 30 to pressurize the fluid within the chamber to any desired pressure, including any positive or vacuum (negative) pressure. The one or more pressure sources (not shown) communicate pressurized fluid to the tread ring-receiving cavity 23a, the tread engaging surface 26, and/or the tread ring 100. The one or more pressure sources include a vacuum pressure source to provide vacuum pressure to the chamber 30 for the purpose of allowing the tread engaging surface 26 to retain and expand the tread ring. The one or more pressure sources may also include a positive pressure source for providing positive pressurized fluid to the chamber to forcefully apply the expanded tread upon the tire carcass. It is understood that the vacuum and positive pressure sources may be provided separately or together in the form of a multi-functional pressure source.

Figure 3:
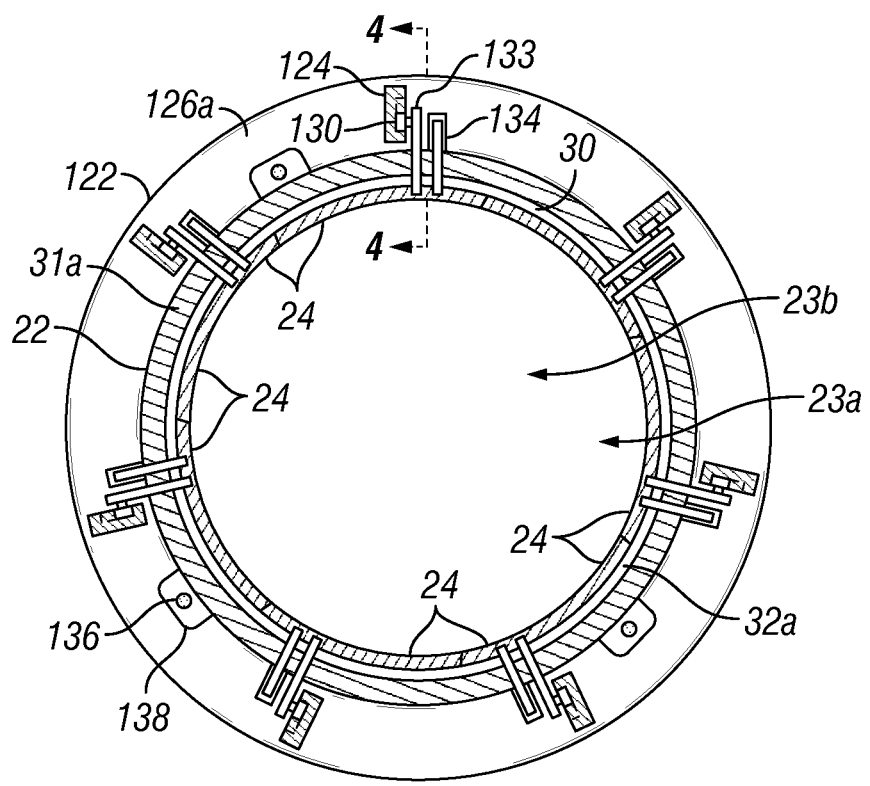
FIG. 3 is a sectional view of a tread ring expansion assembly of the installation device taken along line 3-3 in FIG. 2.
Figure 5:
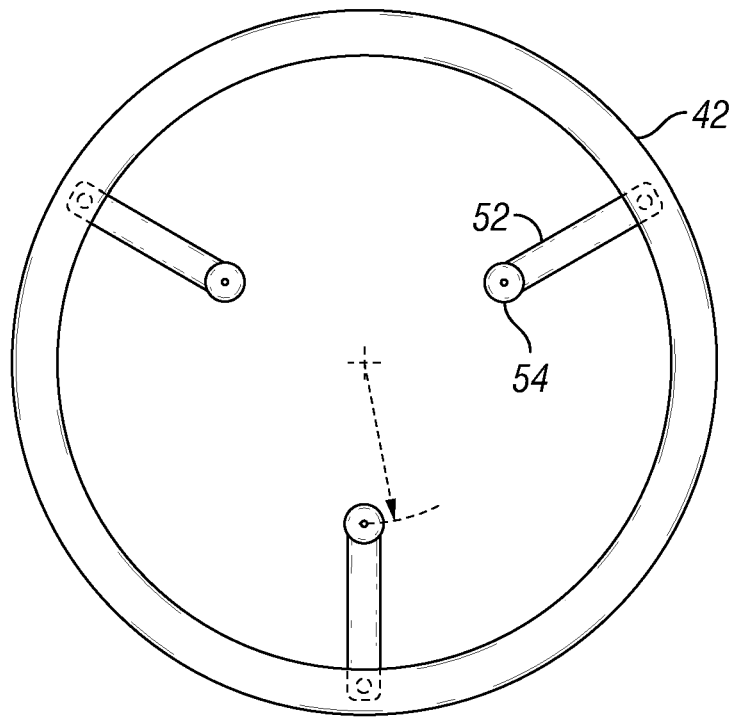
FIG. 5 is an end or axial view of the translatable ring 42 shown in FIG. 4, as viewed from the tire-carcass receiving assembly 80 as shown in FIG. 2.
Figure 4:
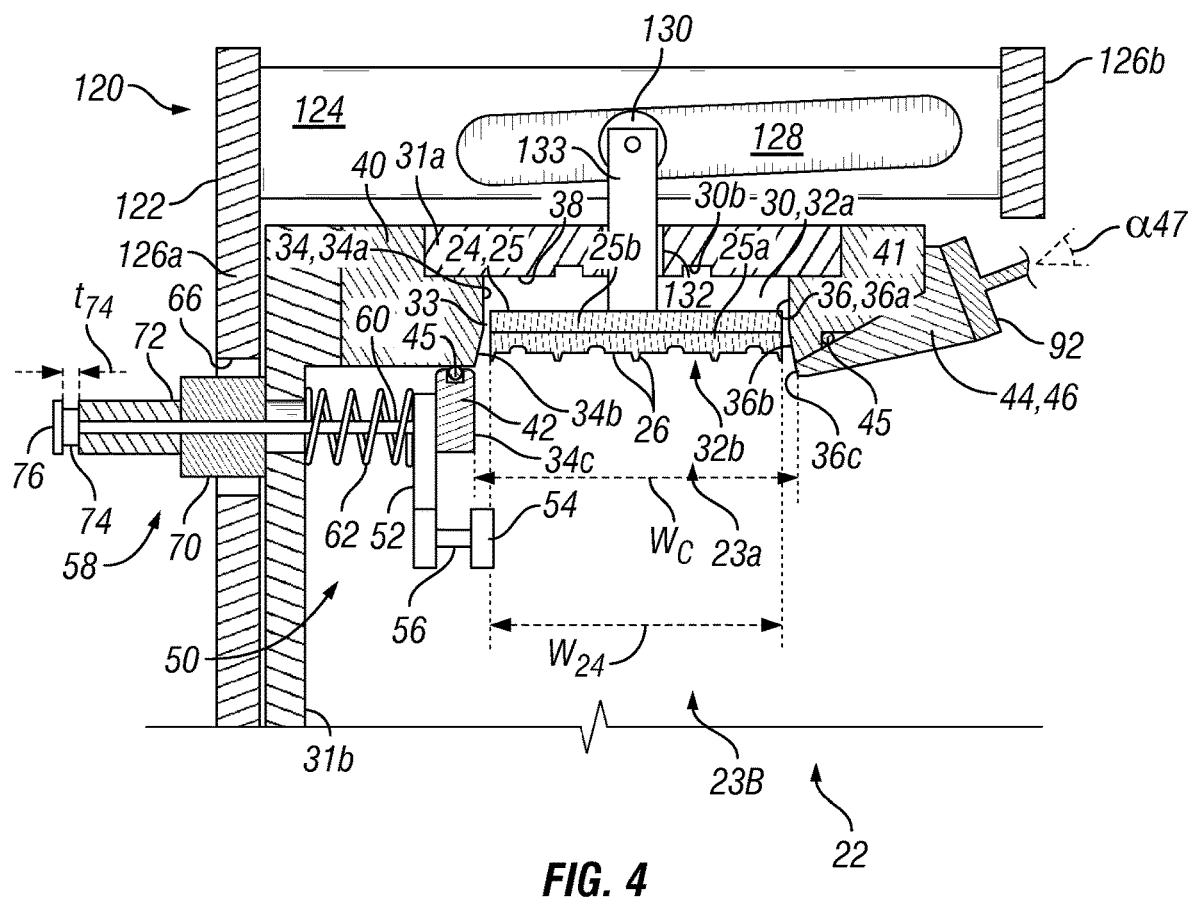
FIG. 4 is a partial sectional view of a tread ring expansion assembly taken along line 4-4 in FIG. 3, the view showing a means for translating a tread expanding member of the tread ring expansion assembly, the tread expanding member being shown in a retracted arrangement.

With reference to FIGS. 3-4, pressurization chamber 30 includes a plurality of tread expanding members 24 arranged annularly about the tread-receiving cavity 23a. Each expansion member includes a body 25 and a tread engaging surface 26 for engaging and controlling the expansion and contraction of the tread ring. Body 25 may be formed of any one or more materials. In the embodiment shown, a first portion 25a including tread engaging surface 26 is formed of aluminum while a second portion 25b is formed of steel. The use of steel or other high strength material in addition to aluminum provides increased strength, although it is understood that using aluminum or any other desired material alone for both first and second portions (which may be formed together as a single portion) may also be employed. Each expanding member 24, as well as body 25, has a width extending axially (i.e., laterally) that is represented by width $W_{25}$. In the embodiment shown, width $W_{25}$ is less than the tread ring width (represented as $W_{100}$ in FIG. 10), although the width may be any desired distance in other embodiments, including equal to or less than tread width $W_{100}$.

With continued reference to FIGS. 3-4, tread engaging surface 26 may be contoured generally to adapt to an outer surface 102 and any features arranged thereon of tread 100. To maximize surface contact between tread ring outer side 102 and outer tread engaging surface 26, outer tread engaging surface 26 may generally comprise a surface configured to generally mate with outer side 102. In particular embodiments, surface 26 generally comprises a negative of at least a portion of outer side 102, whereby surface 26 includes recesses and/or protrusions configured to engage particular corresponding features arranged along outer surface 102. As exemplarily shown in FIG. 4, tread engaging surface 26 extends laterally by an overall width less than the width of the tread ring to be received by surface 26 (i.e., the tread width $W_{100}$ of FIG. 10), while in other variations the width of surface 26 may be any other desired distance, including equal to or less than tread width $W_{100}$.

Figure 11A:
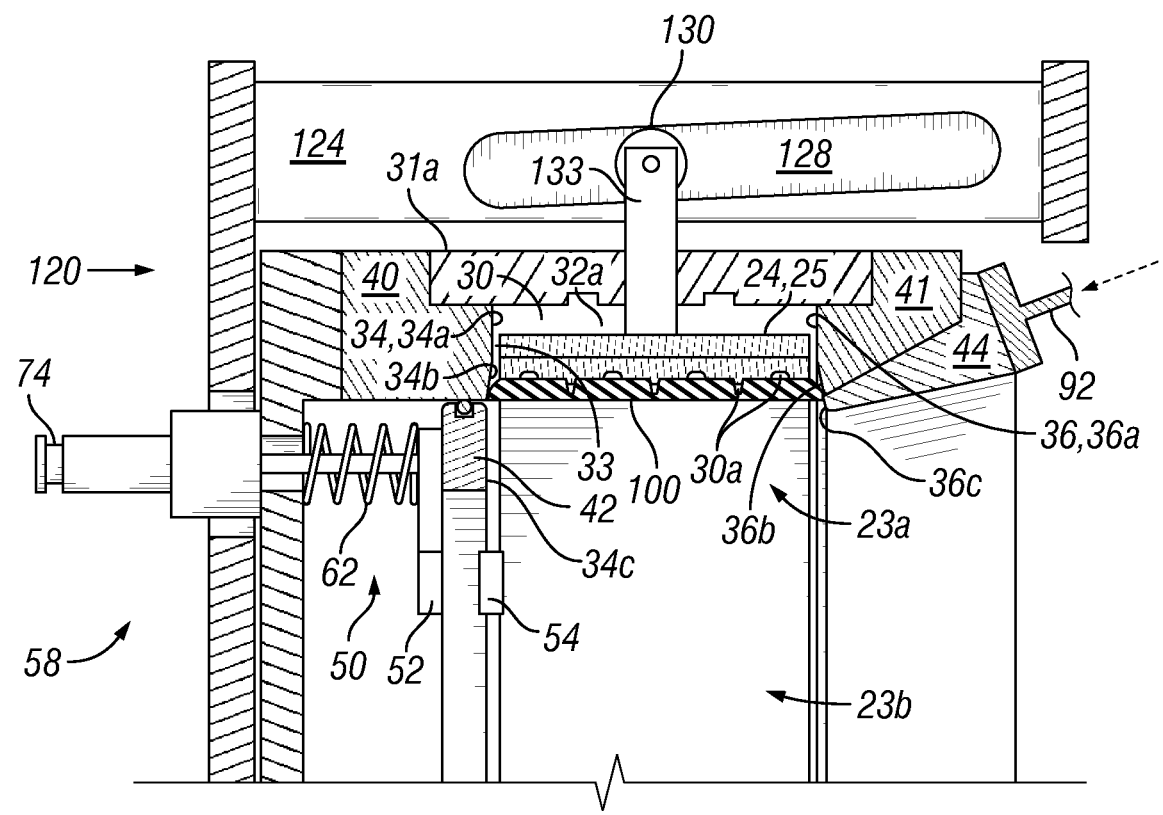
FIG. 11A is a sectional view of a tread ring expansion assembly showing a tread ring having been received within a tread ring-receiving cavity of the expansion assembly, where the tread-engaging surface is in an extended arrangement to receive the tread ring and the displaceable rings 42, 44 are arranged in a tread engaging arrangement to create seal between the side walls and the tread edges to retain the tread ring against the tread ring-receiving surface under vacuum pressure in accordance with an exemplary embodiment of the invention.
Figure 11B:
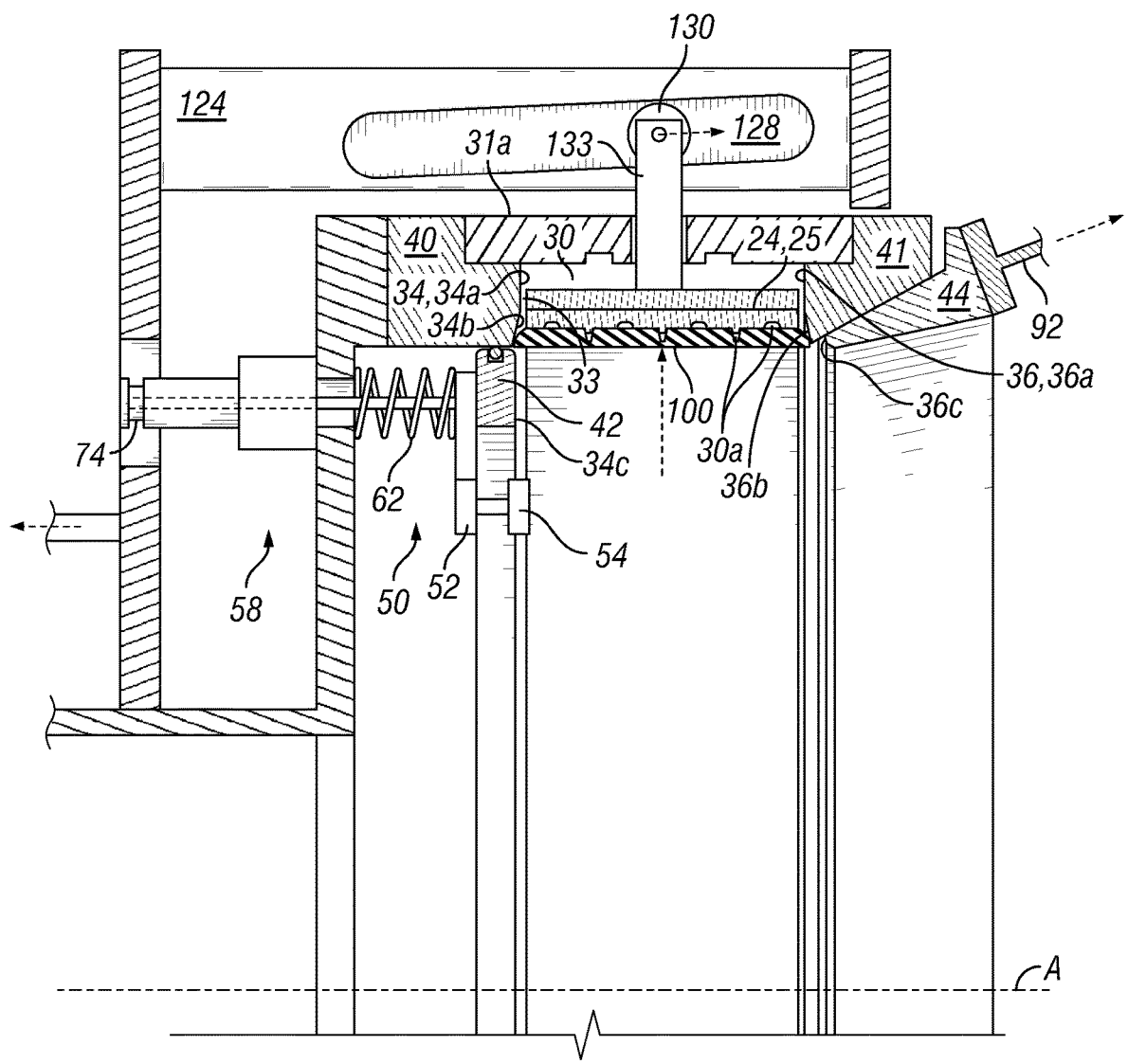
FIG. 11B is a partial sectional view of the tread ring expansion assembly of FIG. 11A showing the retraction of the tread-engaging surface to expand the tread ring for insertion of the tire carcass within the expanded tread ring in accordance with an exemplary embodiment of the invention.
Figure 11C:
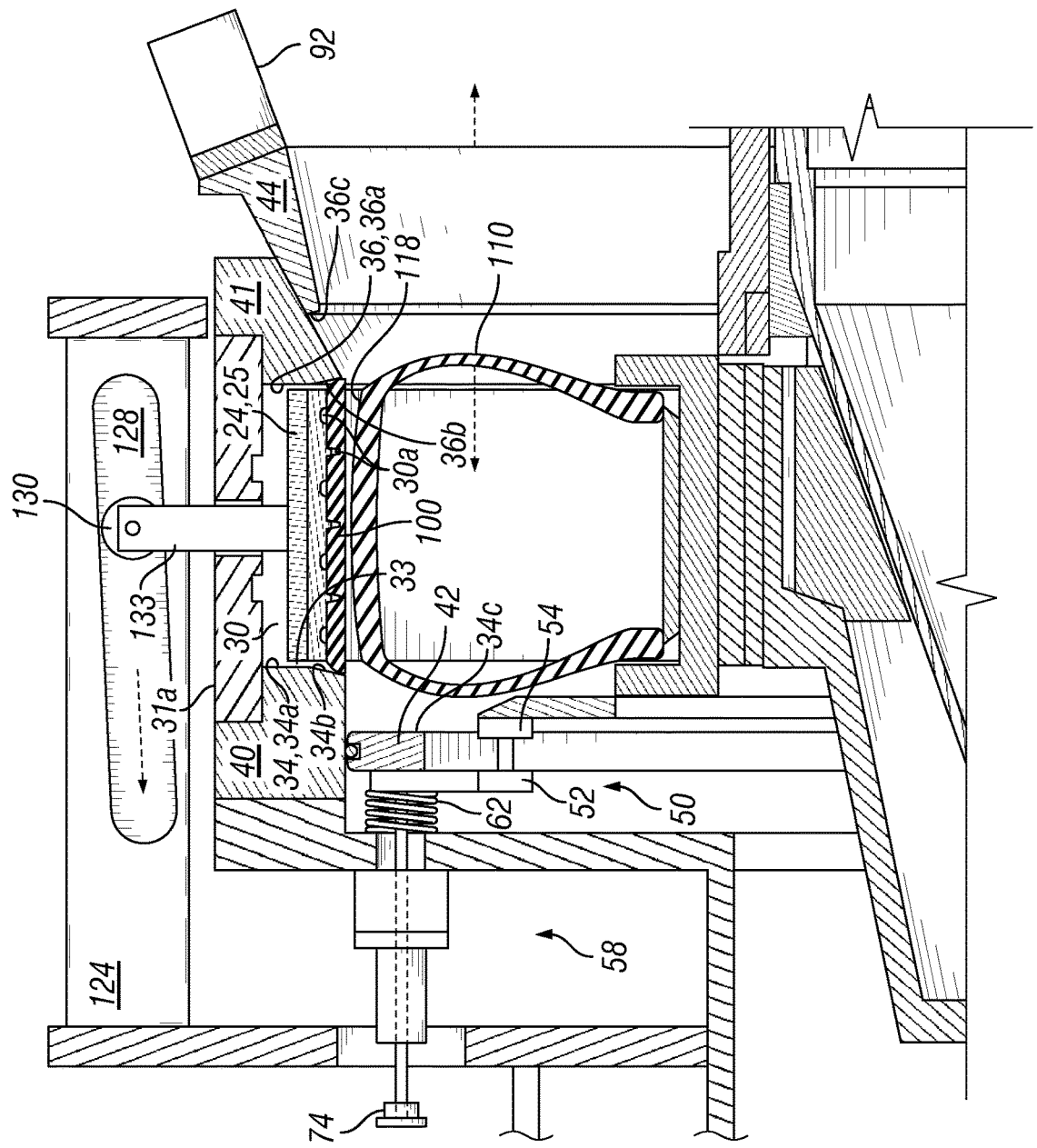
FIG. 11C is a sectional view of the tread ring expansion assembly of FIG. 11B showing the displaceable rings 42, 44 in a retracted arrangement to provide sufficient clearance for insertion of a tire carcass within the expanded tread ring in accordance with an exemplary embodiment of the invention.

Voids 30a may be arranged between the tread 100 and the tread engaging surface 26 to provide a pressurization channel arranged in communication with the pressurization chamber 30 and/or any pressure source. Voids 30a allow any vacuum pressure or positive pressure to remain in communication with the tread 100. Such voids may be arranged anywhere along the tread. For example, voids 30a may be arranged atop a tread rib or lug (i.e., along an outer surface of the tread ring) and/or at a bottom of a tread groove as generally shown in FIGS. 11A-C, for example. To maintain voids in communication with pressurization chamber 30 voids generally extend circumferentially to communicate between either or both circumferential ends of each tread expanding member 24 (discussed further below) forming a segment of an expandable ring. A "generally mating" surface 26 may be configured to provide voids 30a as described above.

The tread engaging surfaces 26 of the plurality of tread expanding members 24 and the outer tread surface 102 generally define the outer limits of the tread-receiving cavity 23a. To facilitate tread ring expansion and application to tire carcass, the tread expanding members 24 translate radially between extended, retracted, and installed tread ring arrangements. In an extended arrangement, with reference to FIG. 11A, the outer tread engaging surfaces 26 are arranged in a radially inward tread-receiving position, whereby the surfaces 26 are arranged about a diameter generally equal to an outer diameter $OD_{100}$ of the tread ring (shown in FIG. 8). In a retracted arrangement, with reference to FIG. 11B, the outer tread engaging surfaces 26 are arranged in a radially outward tread-expanding position, whereby the outer diameter or circumference of cavity 23a is expanded or larger. In the tread expanding position, an outer surface 102 of the tread 100 is retained against the tread engaging surface 26 by vacuum pressure. When, in the embodiment shown, the plurality of tread expanding members 24 are in a tread-receiving position, the tread expansion members are generally arranged in end-to-end engagement to form a closed ring, although slight gaps or separation may exist between the circumferential ends of adjacent members 24. It is understood, however, in other embodiments, that the tread expanding members 24 may be arranged in a spaced relation in the tread-receiving position. In the tread expanding position, the plurality of tread expanding members 24 are displaced radially outward from the tread-receiving position, and therefore are spaced further apart in a spaced annular arrangement.

As mentioned previously, with regard to the embodiment shown in FIGS. 1-4, tread expanding members 24 translate radially relative to tread ring-receiving cavity 23a. To achieve this translation, any means of translation known to one of ordinary skill in the art may be employed. For example, with reference to the figures, such means may comprise a cam assembly 120. The exemplary cam assembly 120 includes a cam frame structure 122 surrounding tread ring expansion assembly 20. Frame 122 comprises a plurality of cross-members 124 extending between opposing annular frame sides 126a, 126b. Cross-members 124 are arranged radially outward the radial enclosure 31a of the tread expansion assembly (i.e., along a radial outer side of enclosure 31a opposite tread expanding member 24). Each cross-member 124 includes a longitudinal recess forming a translation track 128 configured to receive a translation guide 130. Translation guide 130 is attached to linkage 133 extending from tread expanding member 24 and through enclosure 31a. Translation guide 130 is configured to translate along translation track 128 in a radially direction. In the embodiment shown, track 128 is arranged longitudinally in an inclined arrangement along cross member 124, where the track forms a translation path extending in both a radial and axial direction relative to the tread-receiving cavity 23a. A bearing 132 may be arranged along linkage 133 and enclosure 31a to facilitate relative translation there between. Further, a seal (not shown), such as an o-ring, for example, may be arranged between any linkage 133 and enclosure 31a or bearing 132 to better retain pressurized fluid within pressurization chamber 30. One or more guide pins 134 may also extend between tread expanding member 24 and outer enclosure 31a to further control and maintain a desired alignment as each expanding member 24 translates radially relative to the outer enclosure. Just as discussed above with reference to linkages 133, a seal (not shown), such as an o-ring, for example, may be arranged between any guide pin 134 and enclosure 31a to better retain pressurized fluid within pressurization chamber 30. Exemplary pins 134 are shown in FIG. 3. A bearing or bearing surface (not shown) may be arranged along the guide pin or between the pin and the enclosure. Finally, with specific reference to FIGS. 1-3, a plurality of support shafts 136 are spaced circumferentially about the frame 122 to support tread expansion assembly 20. Support shafts 136 extend between annular frame sides 126a, 126b and are slideably connected to the tread expansion assembly 20. In the embodiment shown, each support shaft 136 is configured to translate along a linear bearing 138 fixedly attached to enclosure 31a.

In operation, when it is desired to translate tread expanding member 24 in a radial direction, relative translation between tread expansion assembly 20 and frame assembly 122 is provided. In particular, this relative translation causes translation guide 130 to translate relative to translation track 128, thereby causing the corresponding tread expanding member 24 with tread engaging surface 26 to translate radially. In the exemplary embodiment shown, tread ring expansion assembly 20 remains fixed while frame 122 translates by way of translation means 140, which may comprise any known means for translating. By example, with reference to FIG. 1-2, such translation means comprises a manually operated screw-drive 142 as shown. Other examples include the use of one or more hydraulic or pneumatic cylinders or a rack and pinion mechanism. With continued reference to the exemplary translation means shown, frame 122 is operably attached to a base 150 by shafts 144a and plate 146. Frame 122 translates relative to tread ring expansion assembly 20 as plate 146 translates along shafts 144b by way of screw drive 142. Shafts 144b and screw drive 142 extend between base 150 and a second plate 147. Tread ring expansion assembly 20 is statically affixed to base 150 by way of any structural means 148. In the embodiment shown, structural means 148 includes a central chamber 149 for receiving a leading portion of tire carcass-retaining assembly 80. In other variations, tread ring expansion assembly 20 translates in addition to, or in lieu of, frame 122.

With reference to FIG. 3-4, the tread expanding members 24 generally separate the pressurization chamber 30 into a first portion 32a arranged on a back-side of tread expanding member 24 and a second portion 32b arranged adjacent tread engaging surface 26. Pressurized gas or fluid communicates between the first and second portions 32a, 32b by way of one or more passages 33. In the example shown, passages 33 extend along the lateral side edges of tread engaging member 24 between each member and each side wall 34, 36. In the alternative, or in addition thereto, passages 33 may extend through tread expanding member 24 and tread engaging surface 26 or through any other desired structure of assembly 20. Passages 33 may have any desired cross-sectional size to provide a desired flow rate there through. For example, in the embodiment shown, the lateral width of passage 33 (that is, the distance between any side wall 34, 36 and tread expanding member 24) may be 2 mm or less. Once the tread ring is arranged within cavity 23a, the tread ring is in communication with, and adjacent to, pressurization chamber 30, such as is shown by example in FIG. 11A.

Figure 9:
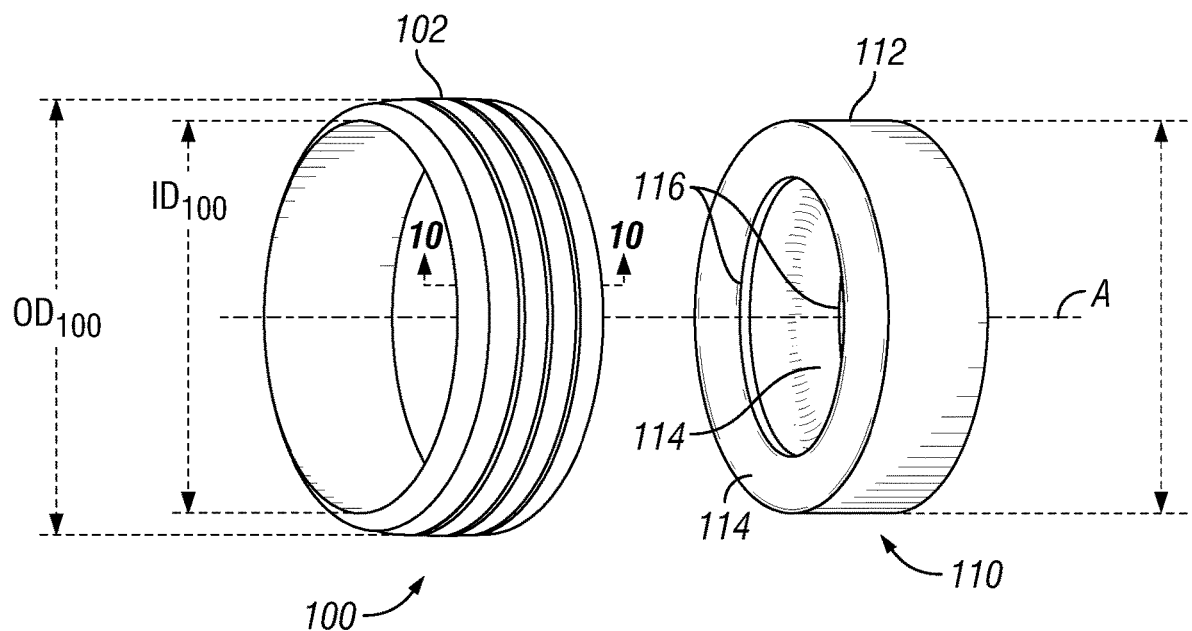
FIG. 9 is a cross-section of the exemplary tread ring of FIG. 8 taken along line 10-10.
Figure 10:
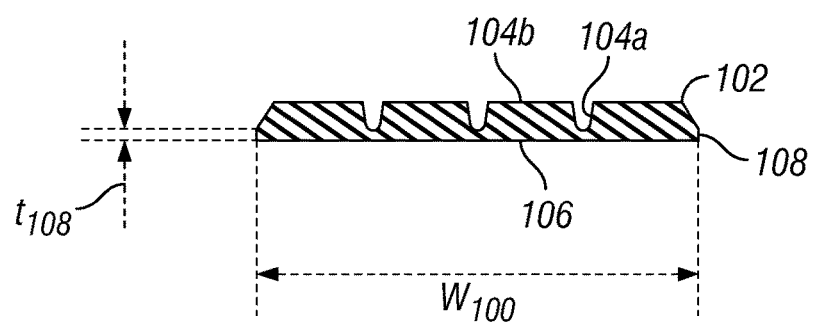
FIG. 10 is a sectional view of a tire carcass-retaining structure generally shown in FIGS. 1-2, showing a tire mounted thereon according to an exemplary embodiment of the invention.

To facilitate retention of the tread ring within assembly 20, the gas or fluid within pressurization chamber is placed under vacuum pressure and a seal created between the tread and the pressurization chamber 30. The pressurization chamber 30 is generally defined by surrounding structure. In the embodiment shown in FIG. 4, the pressurization chamber is bounded by opposing side walls 34, 36 and an outer wall 38. Outer wall 38 may include recesses or channels 30b that form a portion of the pressurization chamber 30 for the purpose of maintaining fluid communication with the pressure source in the situation when tread expansion members 24 fully engage outer wall 38. Side walls 34, 36 are spaced axially apart or laterally relative to a tread ring for arrangement within assembly 20. The side walls 34, 36 are generally spaced laterally apart by a width $W_C$, which is variable. Width $W_C$ is generally equivalent to or smaller than the width $W_{100}$ of the tread or tread ring (which is shown in FIG. 9 as ring 100), at least when engaging opposing side edges of the tread ring. In particular embodiments, the width $W_C$ is smaller than $W_{100}$, such as by approximately 3 millimeters (mm), for example. When generally equal to width $W_{100}$, tread ring 100 is able to slide along the side walls 34, 36 as the tread ring expands between an unexpanded, expanded, and installed arrangements. In particular embodiments, this engagement between each side wall 34, 36 forms a seal between each side wall 34, 36 and the tread ring 100 so facilitate or form a generally sealed pressurization chamber 30.

Figure 13:
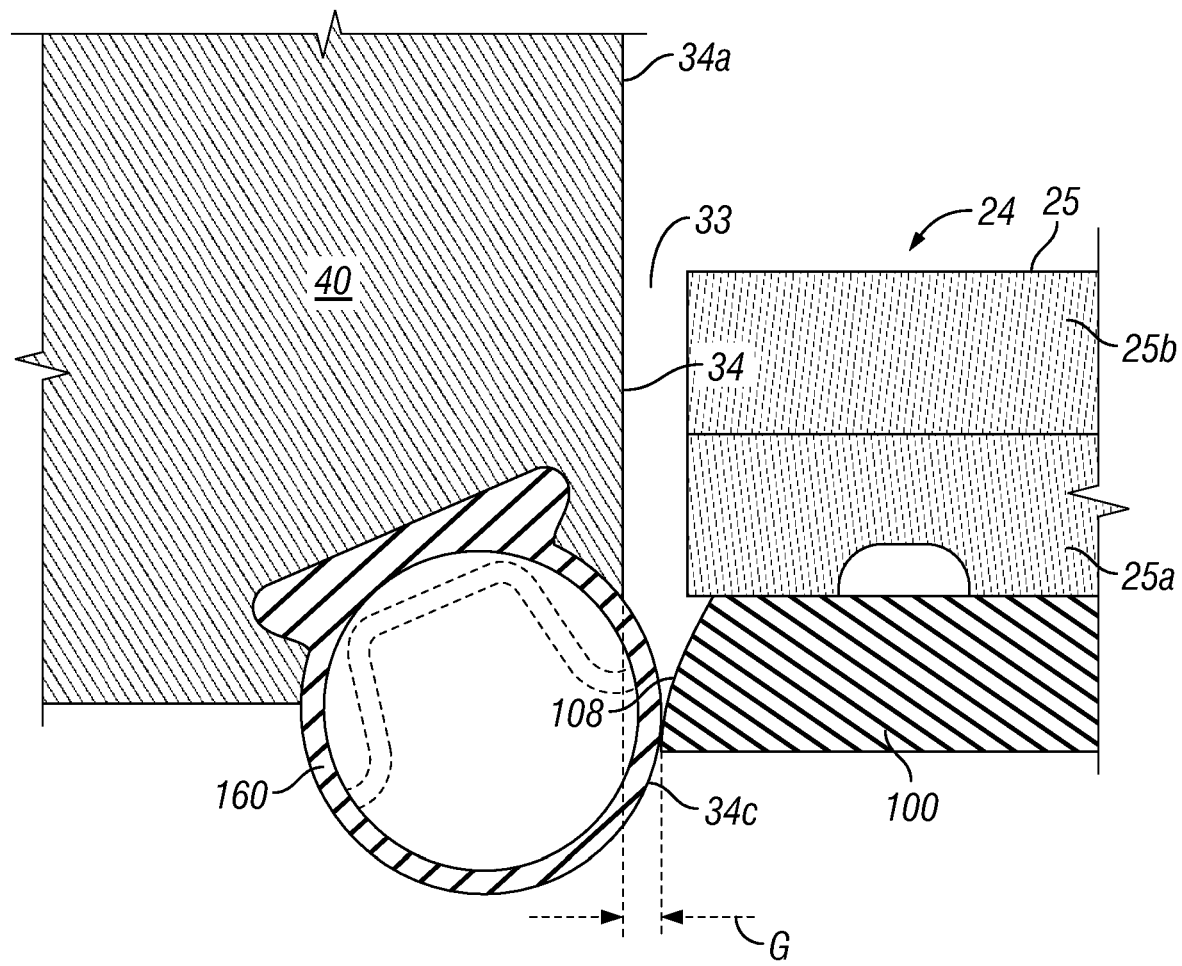
FIG. 13 is a partial sectional view of a tread ring expansion assembly according to an alternative embodiment of the invention, where the first displaceable portion of the pressurization side wall includes an inflatable bladder that is displaceable when expanding with increased inflation to engage the tread and retracting with reduced inflation to retract from the tread-receiving cavity. A dashed portion is shown to represent the collapsed profile of the bladder.

Side walls 34, 36 may remain fixed within assembly 20 and relative to each other and the pressurization chamber, or at least a portion of one or more of the side walls 34, 36 may translate within assembly 20 and relative to each other and the pressurization chamber—such as for the purpose of accommodating different width treads or to provide clearance for receiving a tire carcass and/or to remove the assembled retreaded tire from assembly 20. For example, in the embodiment shown, each side wall has a fixed portion 34a, 36a while side wall 36 has a relatively displaceable (e.g., a retractable, translatable or deformable) portion 34c, 36c. The displaceable portions 34c, 36c are provided to initially engage the side edges 108 of any tread ring 100 (each being shown in FIG. 10) at least partially to initially create a seal between the side walls and the tread ring before tread ring expansion. Displaceable side wall portions 34c, 36c may then be displaced to provide sufficient space to receive a tire carcass upon which the expanded tread will applied. In the embodiment shown, the fixed portion 34a, 36a of each side wall is associated with a relatively fixed side structure 40, 41, respectively, while each displaceable portion 34c, 36c is associated with a displaceable side structure. For example, in the embodiment shown, displaceable portion 34c is associated with a side structure comprising a first annular member 42 while displaceable portion 36c is associated with a side structure comprising a second annular member 44. First and second annular members 42, 44 may comprise any desired structure. For example, in the embodiment shown, first annular member 42 comprises an axially translatable tread edge sealing ring while second annular member 44 comprises an expandable tread edge sealing ring. By further example, with reference to FIG. 13, a displaceable portion 34c, 36c of any side wall 34, 36 may comprise an inflatable bladder 160 that deforms to engage (upon expansion or inflation) and disengage (upon contraction or deflation) a side edge 108 of a tread ring 100. In operation, bladder 160 expands to fill a gap G between a tread side edge and a side wall 34, 36.

Figure 14:
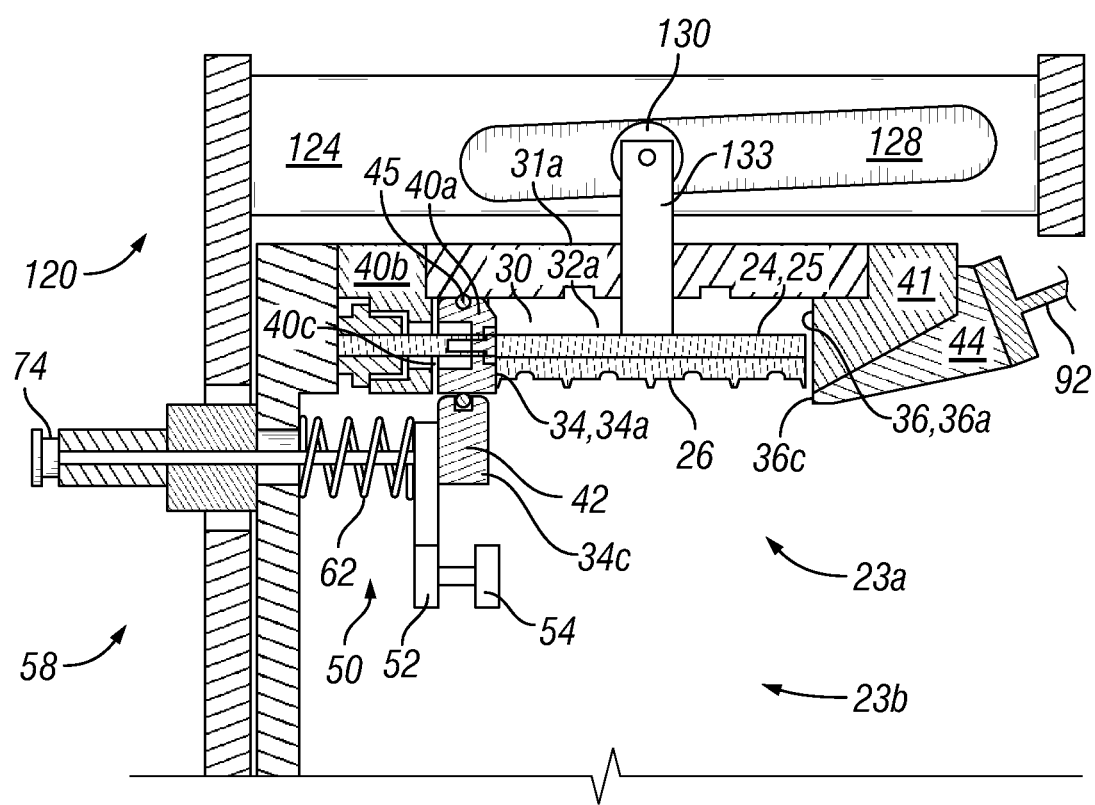
FIG. 14 is a partial sectional view of a tread ring expansion assembly according to an alternative embodiment of the invention, where the first side wall is translatable axially to accommodate any change in tread width during tread expansion.

In certain instances, the tread width $W_{100}$ narrows as the tread ring expands. To maintain engagement between the tread edges and the side walls 34, 36, at least one of the side walls translates or narrows as the tread width narrows during tread ring expansion (and increases with tread ring contraction). In the embodiment shown in FIG. 4, each side wall 34, 36 includes a tapered portion 34b, 36b to provide a width $W_C$ that narrows from a full width (such as width $W_{100}$) as each side wall increases in diameter in a radial direction. In the embodiment shown, tapered portion 34b extends along structure 40 (and may also continue on to side wall 34c of translating ring 42). Further, tapered portion 36b extends along ring 41 and continues onto side wall 36c of retractable ring 44, but it is understood that tapered portion may remain solely on fixed ring 41 (while ring 41 translates with unit 90, ring 41 remains fixed in relation to expandable ring 44 as it expands and retracts). In other embodiments, such as shown exemplarily in FIG. 14, in lieu of or in addition to the existence of any tapered portion 34b, 36b, a side wall may be translatable to maintain engagement between side wall 34, 36 and any tread ring side edge 108 (as is exemplarily shown in FIG. 10) as the tread width narrows during tread ring expansion. This is different than a side wall portion 34c, 36c that may retract or displace away from the tread receiving cavity 23a and engagement with tread 100. As shown by example in FIG. 14, side wall 34a may be associated with a side structure 40 having a translatable portion 40a that translates relative a static portion 40b along a pin or other translation facilitating means. Translation between the portions 40a, 40b may endure over a short distance, or any distance that allows the side wall 34a to remain in contact with a corresponding tread edge 108 as the tread ring width $W_{100}$ narrows during tread ring expansion operations. Gap 40c represents an amount of translation that portion 40a may travel. In the embodiment shown, translatable portion 40a is freely translatable, and translates due to the application of vacuum pressure within pressurization chamber 30 (to which portion 40a is adjacently arranged). Other means of translating portion 40a may be employed in other embodiments.

With continued reference to FIG. 4, translatable tread edge sealing ring 42 includes side wall 34c extending radially and annularly about pressurization chamber 30 and tread ring-receiving cavity 23a. In other variations, side wall 34c may extend from, and taper with, side wall 34b to provide a variable width side wall arrangement. Translatable ring 42 translates axially (i.e., laterally) while engaging an underside side structure 40. In the embodiment shown, ring 42 translates laterally between a tread ring engaging arrangement, which positions side wall portion 34c flush or co-planar with side wall portion 34b as shown exemplarily in FIGS. 11A-11B, and a recessed arrangement laterally spaced from the tread ring engaging arrangement and the tread-receiving cavity as exemplarily shown in FIG. 11C. A sealing member 45 is arranged between the ring 42 and side structure 40 to prevent substantial loss of pressurized gases from pressurization chamber 30 during tread retention and expansion operations. Sealing member 45 may comprise any known means of sealing, such as an elastomeric seal or gasket. It is understood, however, that sealing member 45 may not be employed, such as when sufficient vacuum pressure is provided to overcome any loss of vacuum pressure between ring 42 and a sealing surface along structure 40. In particular embodiments, side wall portion 34c is positioned to be flush or co-planar with fixed side wall portion 34a. A stop (not shown) may be provided, such as along return mechanism 58 (discussed below with reference to FIG. 4), for example, to control the movement of sealing ring 42 and align side wall portion 34c with either side wall portion 34a, 34b as desired.

A displacement mechanism 50 may be provided to automatically force translatable tread edge sealing ring 42 from the tread engaging arrangement and to a recessed arrangement away from the tread-receiving cavity during operation of the device 10. For example, with reference to FIGS. 4-5, 11A-11C, displacement mechanism 50 comprises an arm 52 extending radially inward from sealing ring 42 and arranged to engage a desired portion of the tire carcass-retaining assembly 80 as the assembly 80 translates inwardly to arrange a tire carcass 110 within assembly 20. An engagement pad 54 may be arranged along arm for direct engagement with tire carcass-retaining assembly 80. Pad 54 may extend any desired distance from arm 52, where said distance may be fixed or selectively adjustable. In particular, such distance may be selected to allow a contact surface of the pad 54 to engage the tire carcass-retaining assembly 80 before the assembly 80 or any carcass mounted thereon engages the tread edge sealing ring 42. Any known means 56 to provide a fixed or adjustable connection between pad 54 and arm 52 may be employed, such as a weld or fastener. In the embodiment shown, tire carcass-retaining assembly 80 includes an engagement member 88 arranged on the arm side of the carcass mounting area 82 to first engage pad 54 as assembly 80 approaches. It is understood, however, that an independent engagement member 88 may not be employed, but rather an existing portion of assembly 80.

To facilitate return of tread edge sealing ring 42 from its recessed arrangement to its tread engaging arrangement, the displacement mechanism 50 includes a return mechanism 58. While manual methods may be employed to facilitate such translation, any known semi-automatic or automatic means of translating sealing ring 42 from a recessed arrangement to a tread engaging arrangement may be employed. In one example, with reference to FIG. 4, a compression spring 62 is used to bias the sealing ring 42 in the tread engaging arrangement. In the specific example shown, a longitudinal member 60 extends from ring 42 in the translation direction of sealing ring 42 (that is, the direction in which ring 42 translates between the tread engaging arrangement and the recessed arrangement) and through an aperture 66 arranged in side enclosure 31b of ring receiving unit 22. Between enclosure 31b and ring 42 or arm 52, a spring 62 is arranged to bias ring 42 in a desired position. While a compression spring is shown, any other type of spring may be used in other arrangements.

In operation, compressive spring 62 applies a force against arm 52 or ring 42 to bias sealing ring 42 in the tread engaging arrangement. And when the carcass-retaining structure 80 engages the arm 52 or pad 54 of the displacement mechanism 50, the force of engagement causes the flange to compress the spring 62 as the sealing ring 42 translates from the tread engaging arrangement. A linear bearing 70 may be arranged along longitudinal member 60 to support and facilitate translation of longitudinal member 60. A displacement control spacer 74 of desired thickness $t_{74}$ may be arranged along between spaced constraints, such as between a removable end cap 76 of the longitudinal member 60 and a housing 72 as exemplarily shown or linear bearing 70. If further displacement of longitudinal member 60 is desired, a spacer of reduced thickness $t_{74}$ is selected for use in displacement mechanism 50. And if less displacement is required, a spacer of increased thickness $t_{74}$ is employed. It is understood that any other means of controlling the displacement of sealing ring 42 may be employed.

Having just discussed the first tread edge sealing ring 42, we will now discuss the second tread edge sealing ring 44. With reference to FIGS. 1-2, 4, 6A-6B, the second sealing ring comprises an expandable ring 44 having multiple segments 46 displaceable between a closed ring arrangement and an expanded open ring arrangement. Any number of segments may be provided. In the embodiment shown, three (3) segments are employed, each extending 120 degrees about a central axis of ring 44 to form a closed 360 degree ring when in the closed ring arrangement. Each segment 46 includes a retractable side wall 36c that translates with each segment as the segments translate axially and radially relative to each other during ring 44 expansion. In the closed ring arrangement, the segments 46 each engage an adjacent segment such that the side walls 36c of all segments are arranged to form an annularly extending side wall 36c. In the open ring arrangement, the segments 46 are spaced apart circumferentially in an annular arrangement. Additionally, in the embodiment shown, the entire ring 44 with segments 46 is operably attached to a base 91 of translatable ring unit 90, the unit configured to translate along track 12 using guides 14. Translation may be achieved using any known means for translating, such as by a hydraulic or pneumatic cylinder, linear drive, or motor in communication with a belt, gear, or chain drive, for example. In the embodiment shown, side wall 36c tapers laterally while extending in a radial direction (as with side wall 36b) to provide a variable width side wall arrangement. In other variations, side wall 36c extends radially and annularly about pressurization chamber 30 in similar fashion to side wall 36a.

Ring 44 and each segment 46 includes an outer surface 46a that extends at an incline (identified as angle $\alpha_{47}$) relative to central axis A of ring 44 from side wall 36b. Said incline may comprise any desired angle between zero (0) and ninety (90) degrees. For example, angle $\alpha_{47}$ may comprise approximately 30 degrees. This outer surface 46a translates along a similarly inclined inner annular surface 41a of side structure 41. A sealing member 45 is arranged between each segment 46 and side structure 41 to prevent substantial loss of pressurized gases from pressurization chamber 30 during tread retention and expansion operations. However, sealing member 45 may not be employed, such as when sufficient vacuum pressure is provided to overcome any loss of vacuum pressure between surfaces 41a, 46a. When ring 44 is in a closed ring arrangement and engaged with inner side member surface 41a, the ring is in a tread engaging arrangement. When ring 44 is in an open ring arrangement, the ring is in a recessed arrangement.

To facilitate the expansion and contraction of ring 44, a means for expanding and contracting the ring 44 and translating each segment 46 is provided. Any such means may be employed. For example, in the embodiment shown in FIGS. 1-2, 4, 6A-6B, an actuator 92 is operably attached to each segment to translate each segment between the closed and open ring arrangements. To translate each segment along the inner surface 41a of side member 41, each actuator is arranged to extend and retract at an angle $\alpha_{47}$ relative to ring central axis $A_{44}$. To facilitate translation of each segment, each actuator 92 is attached to a rigid support 98. A mounting bracket or the like may be used to attach said actuator to said base structure at any desired arrangement. Rigid support 98 includes a central opening 99 generally concentric with ring 44, which allows a tire carcass to pass there through for tread application in assembly 20.

Figure 6A:
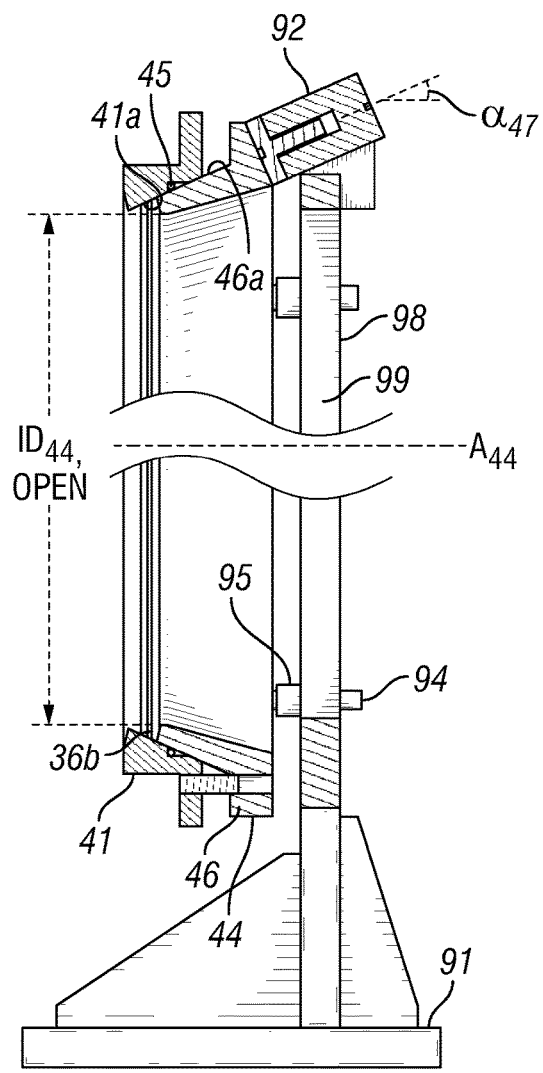
FIG. 6A is a sectional view of the translatable ring unit 90 taken along a plane bisecting expandable ring 44 and extending through and parallel with central axis A of expandable ring 44 as shown in FIG. 2, the expandable ring and its segments being shown in an expanded ring arrangement.
Figure 6B:
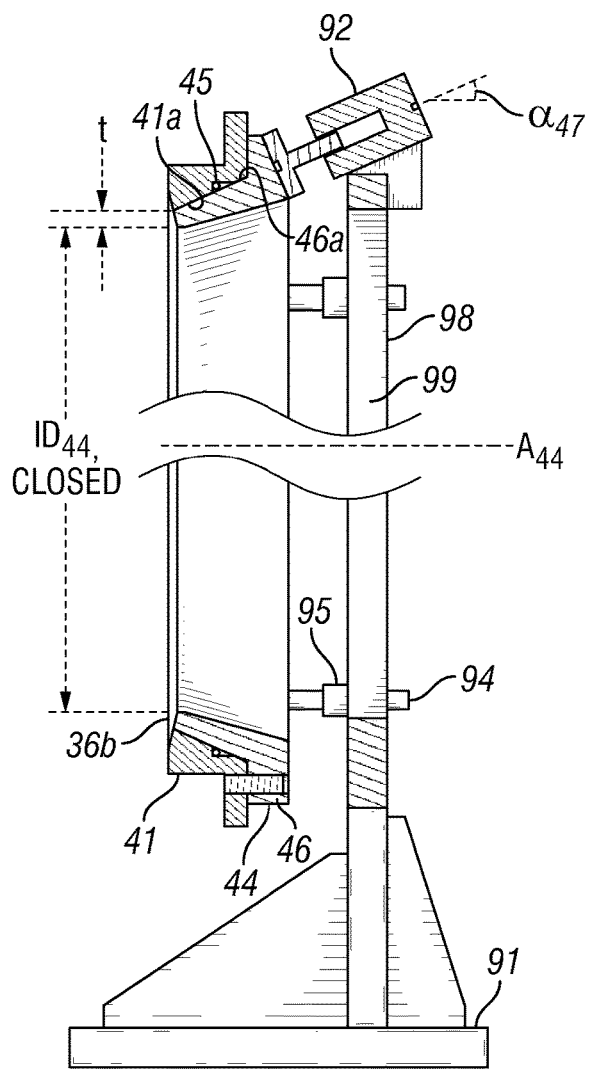
FIG. 6B is a sectional view of the translatable ring unit 90 of FIG. 6A with the expandable ring and its segments being shown in a closed ring arrangement.

With reference to FIG. 6A, ring 44 is shown in an open arrangement. In the open arrangement, actuators 92 are retracted to provide a ring 44 having an open inner diameter $ID_{44, open}$ extending between the inner end of side walls 36b. In the embodiment shown, the open ring inner diameter $ID_{44, open}$ is selected to be greater than the outer diameter $OD_{110}$ of tire carcass 110 (shown in FIG. 8) to allow the tire carcass to pass centrally through ring 44. With reference to FIG. 6B, ring 44 is shown in a closed arrangement. In the closed arrangement, actuators 92 are extended to provide a ring 44 having a closed inner diameter $ID_{44, closed}$, which is certainly less than open inner diameter $ID_{44, open}$. In the embodiment shown, closed inner diameter $ID_{44, closed}$ is smaller than tread ring outer diameter $OD_{100}$ (shown in FIG. 8).

Figure 7:
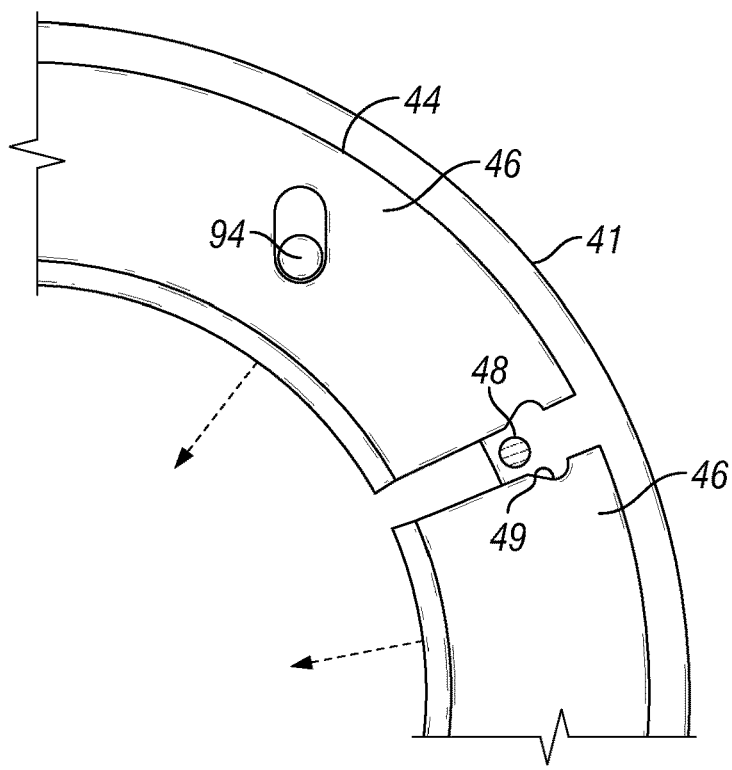
FIG. 7 is an end or axial view of the expandable ring of FIG. 6A taken between the ring and the support to show the pin slot and the mating protrusion and recess.

With reference to FIGS. 1-4, each segment 46 of ring 44 translates along guide pins 94, which extend between fixed ring 41 and support 98 to further control the translation of segments 46. With reference to FIG. 7, a slotted aperture 96 extending through each segment 46 and radially outward relative to axis $A_{44}$ is provided to allow each segment to translate radially during ring expansion and contraction. Each pin may also have a thickened portion 95 (e.g., a larger diameter or cross-section) between each segment 46 and support 98 that acts as a stop to prevent engagement of each segment 46 and each support 98.

While guide pins may generally assist in controlling the translation of each segment, additional features may be employed to control the alignment between adjacent segments. With further reference to FIG. 7, the side end surfaces 47 of adjacent segments 46 include a recess 49 configured to receive a portion of a pin 48 arranged between adjacent side end surfaces 47. The pin 48 is arranged within fixed ring 41, although said pin 48 may be arranged in any other structure, such as support 98. By providing the pin and recess arrangement along adjacent side surfaces, each recess 49 directs each segment 46 to a desired arrangement relative each adjacent segment 46 to control relative alignment between adjacent segments as the ring 44 closes. While each pin 48 and mating recess 49 is shown extending longitudinally in an axial direction, both may extend at any other desired angle relative to axis $A_{44}$. It is also understood that the pin may comprise any shaped member.

As suggested above, tread ring expansion assembly 20 also receives a tire carcass 110 for mounting a tread ring 100 thereon. To facilitate this, as exemplarily shown in FIGS. 3-4, tread ring expansion assembly 20 includes a tire carcass-receiving cavity 23b arranged radially inward the tread-receiving cavity 23a. Each cavity 23a, 23b is annular and concentric with the other, and may comprise the same cavity without any structure arranged there between as generally shown in the figures.

To facilitate insertion of a tire carcass 110 within an expanded ring retained within tread expansion assembly, a tire carcass-retaining structure 80 is provided. Carcass-retaining structure 80 is configured to retain tire carcass 110 along a carcass-mounting area 82 arranged annularly about the tire carcass-retaining structure. Carcass-retaining structure 80 may comprise any means for retaining a tire carcass 110 known to one of ordinary skill in the art. For example, carcass-retaining structure 80 may include one or more annular bead-engaging surfaces 84 upon which one or more of the tire carcass beads 116 engage in a mounted arrangement. The one or more bead-engaging surfaces 84 may expand and contract between mounted and unmounted arrangements. By example, the one or more bead-engaging surfaces 84 may comprise a fixed or rigid ring, which may extend axially between each bead 116, or may comprise a pair of rings, each ring arranged to receive one of the beads 116. By further example, the one or more bead-engaging surfaces 84 may be associated with one or more expandable rings, which may comprise rigid segments or a flexible sleeve expandable by use of an inflatable bladder or other structure arranged there under to expand the surfaces.

In particular embodiments, the tread ring expansion assembly 20 and the tire carcass-retaining structure 80 are configured to communicate between a separated arrangement and a tread-ring mounting arrangement, where in the tread ring-mounting arrangement the annular tread ring-receiving cavity is arranged radially outward the tire carcass-receiving area. It is understood that any means of communicating or translating the tread ring expansion assembly 20 and the tire carcass-retaining structure 80 between a separated and tread ring-mounting arrangements that is known to one of ordinary skill may be employed. For example, with reference to FIGS. 1-2, tire carcass-retaining structure 80 is translatable relative to tread ring expansion assembly 20 along a track 12, whereby tire carcass-retaining structure 80 is attached to a base 86 slidably engaged with or mounted to track 12 with guides 14. Each guide 14 may include a bearing means for creating low-friction translation between the track and each guide. For example, the bearing means may comprise a layer or coating of low-friction material arranged between the track and the guide, or may comprise any other known bearing means, including a mechanical bearing, such as a ball or roller bearing. Further, by example, the means for translating tire carcass-retaining assembly 70 may include a linear motor with a gear, belt, and/or chain linkage for communicating the generated driving force. By further example, one or more hydraulic or pneumatic cylinders may be employed to translate tire carcass-retaining structure 80. In other variations, any of the tread ring expansion assembly 20 and expandable ring 44 may translate by also employing a means for translating as generally discussed herein to create relative translation between the tread ring expansion assembly 20 and the tire carcass-retaining structure 80. As suggested above, relative translation may exist between the tread ring expansion assembly 20 and an expandable ring 44, and any such means of translation may also be used to facilitate this translation.

Device 10 may also include a heating unit (not shown) for at least partially curing a joining material arranged between the tread ring 100 and the tire carcass 110, or even for partially curing the tread ring to the tire carcass whether or not any joining material is arranged there between. The heating unit may comprise any known means of heating a tire tread or tire carcass or for curing a joining material arranged between a tire tread and carcass. Further, the heating unit may be capable of generating any temperature required to achieve its purpose. For example, the heating unit may heat the tread to at least 120 degrees Celsius. It is also understood that the heating unit may comprise a single heating element or unit or plurality of individual heating elements or units spaced annularly about the tread. By further example, heating units include employ electric resistance or wave form technologies.

Figure 8:
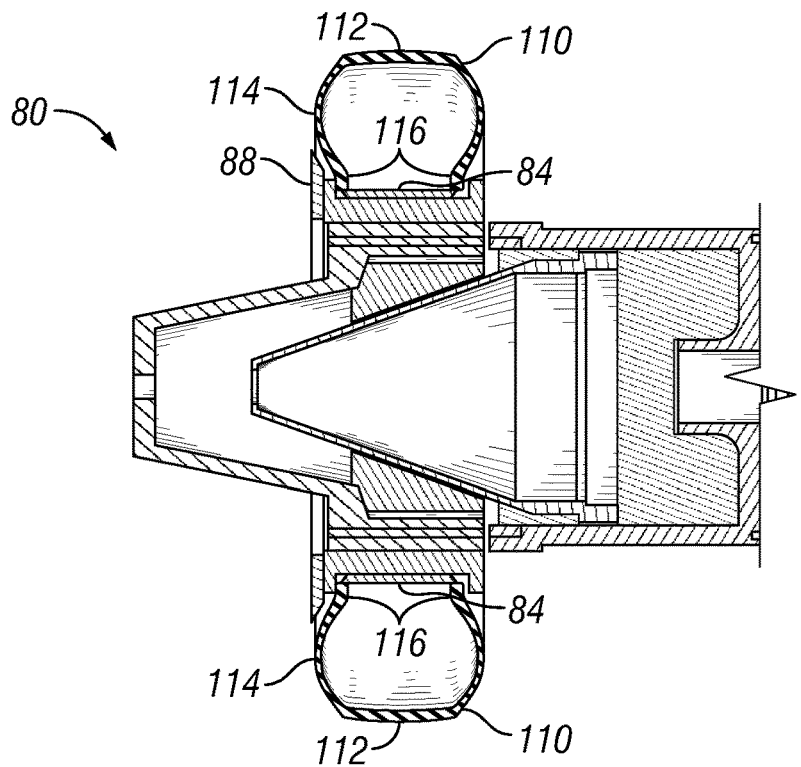
FIG. 8 is a side perspective view of a tread ring and a tire carcass according to an exemplary embodiment of the invention.

With reference to FIG. 8, an exemplary tread ring 100 is shown. A tread ring 100 extends annularly and generally includes an outer side 102 associated with an outer ring diameter $OD_{100}$ and an inner side 106 (also referred to as an "underside") associated with an inner diameter $ID_{100}$, the inner and outer sides being separated by a thickness of the tread. The outer side 102 generally forms a ground-engaging side of the tread and therefore may include a tread pattern comprising various tread features, such as grooves 104*a* separating tread ribs 104*b*, for example. The inner side 106 generally comprises an underside surface for attachment to a tire carcass 110, where joining material may or may not be arranged between the tread ring 100 and tire carcass. Joining material may comprise any elastomeric or curable material or any adhesive know in the art to attach a tread to a tire carcass. Each tread ring 100 has a width $W_{100}$ defined by opposing side edges 108. In particular embodiments, each side edge 108 has a generally flat surface 108*a* extending annularly about the tread ring and in a generally radial direction of the tread ring 100. "Generally flat" connotes that the surface extends linearly or slightly non-linearly through a thickness of the tread. The side edge surface 108A may be used to form a seal between the tread ring 100 and the pressurization chamber 30, and more specifically between the tread ring and a side wall 34, 36 arranged adjacent each side edge 108, which is exemplarily shown in FIGS. 11A-11C. Surface 108*a* may have any desired width, which is identified as thickness $t_{108}$ in FIG. 8. For example, $t_{108}$ may be approximately 2-4 millimeters (mm) or 2 mm or less. In other variations, other surfaces of the tread ring may be used to form a seal, including any other surface along outer side 102.

With continued reference to FIG. 8, an exemplary tire carcass 110 is also shown. A tire carcass 110 generally includes a tread-receiving surface 112 forming a band extending annularly about the tire carcass. Surface 112 is also associated with an outer diameter $OD_{110}$ of the tire carcass. In particular embodiments, the tread-receiving surface 112 is prepared to receive the tread. For example, surface 112 may be abraded or roughened by any known means, such as by any buffing, grinding, or sand blasting operation. By further example, a joining material 118 (see FIG. 11C) may be applied to surface 112—whether or not the surface has been abraded, roughened, or otherwise prepared. Annular tire carcass further includes a pair of laterally opposing side walls 114, each side wall extending radially between the tread-receiving surface 112 and a bead or tire mounting area 116 for mounting the tire carcass upon any tire mounting apparatus, such as a wheel or tire carcass-retaining structure 80.

As suggested above, joining material 118 may be used to attach tread ring 100 to tire carcass 110. Joining material 118 may be arranged along either or both a tread ring underside 106 and the tread-receiving surface 112. In FIG. 11C, joining material 118 is arranged along tread-receiving surface 112 prior to receiving the expanded tread ring 100. It is understood that joining material may comprise any known material for joining a tread to a tire carcass, including any known adhesive or elastomeric joining material, for example.

With reference to FIG. 11A, operation of device 10 includes initially arranging a tread ring 100 within the tread-receiving cavity 23*a* of tread ring expansion assembly 20, with the tread expanding member 24 in an extended arrangement to engage the outer surface 102 of the tread ring. Further, translatable rings 42, 44 are arranged in a tread edge engaging arrangement, and in particular, expandable ring 44 is arranged in a closed ring arrangement, to provide a sealing engagement with each tread edge of the tread ring. Subsequently, with reference to FIG. 11B, where pressurization chamber is placed under vacuum pressure, frame 122 translates (to the left as exemplarily shown) such that guide 130 translates radially outward (and to the right) along translation track 128. In response, tread expanding member 24 translates radially outward within pressurization chamber 30 to expand the tread ring, which is engaged with expanding member 24. In the expanded arrangement, the inside diameter $ID_{100}$ of tread ring 100 is larger than the outside diameter $OD_{110}$ of tire carcass 110.

Figure 12:
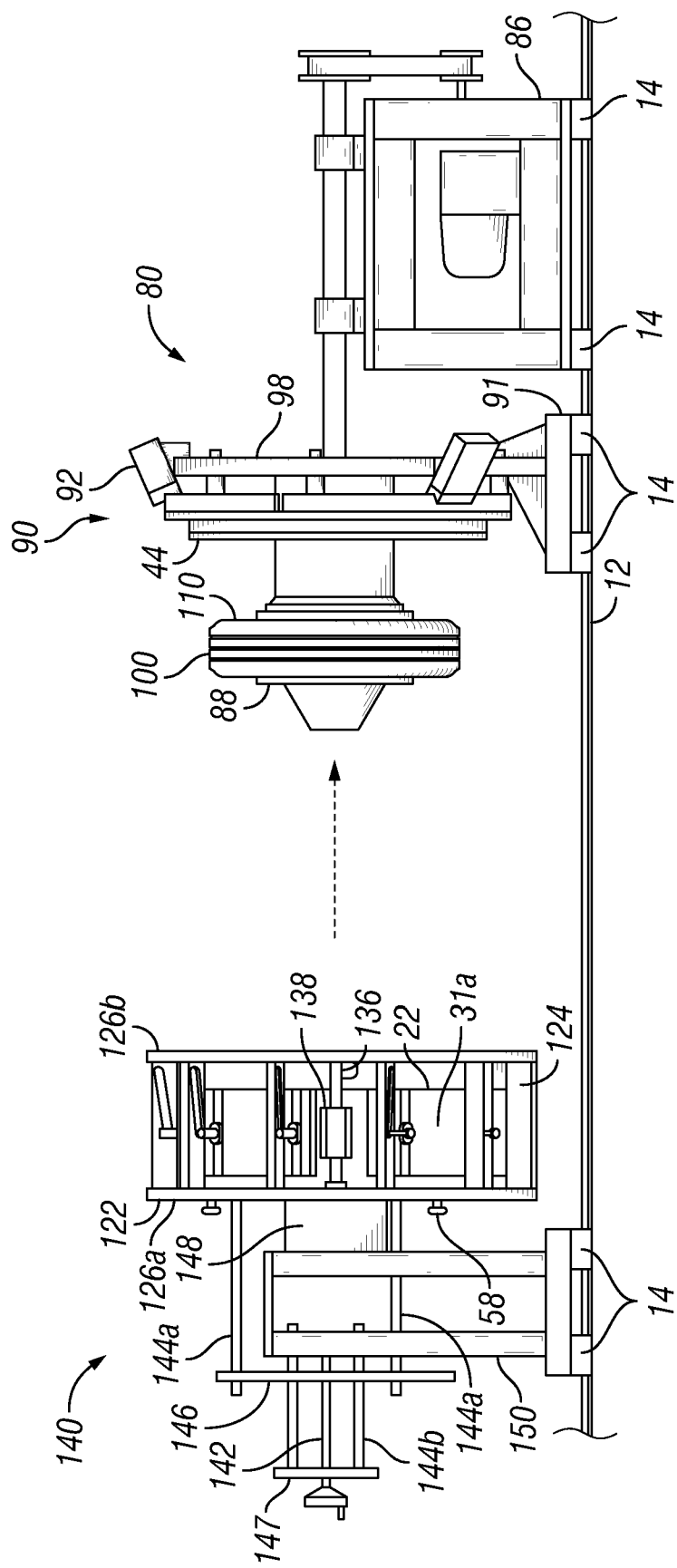
FIG. 12 is a side elevational view of the tread ring installation device of FIG. 1, showing an assembled retreaded tire retracted from the tread expansion assembly according to an exemplary embodiment of the invention.

After tread ring expansion, joining material 118 may be arranged along either or both the tread ring underside 106 and the tire carcass tread-engaging surface 112 at any instance before the tire carcass 110 is inserted into the expanded tread ring 100. With reference to FIG. 11C, ring 44 is retracted and rings 41, 44 translated outwardly from tread ring expansion assembly 20. Tire carcass 110 is then inserted into a carcass-receiving cavity 23b of the tread ring expansion assembly 20 while tread ring 100 is in an expanded arrangement. Subsequently, the expanded tread ring is contracted as the tread expanding member 24 is retracted toward the tire carcass. This is achieved as frame 122 translates (to the right) to cause guide 130 to translate radially inward (and to the left) along track 128. Once the tread ring is arranged onto the tire carcass in an installed arrangement, vacuum pressure is released from the pressure chamber. Positive pressure may also be added to forcefully apply the tread ring onto the tire carcass. Further force may be provided by further extending or over-extending tread expanding member 24 towards the tire carcass. The tread expanding member 24 may then be retracted and the assembled treaded tire carcass removed as shown in FIG. 12. As shown, the assembled retreaded tire is arranged between the translatable ring unit 90 and the tread ring expansion assembly 20. This is because the assembled retreaded tire is of such size that the retreaded tire cannot pass through translatable ring unit 90. Any joining material 118 arranged between the tread ring 100 and the tire carcass 110 may be heated by a heating unit either within the tread ring expansion assembly 20, such as by heating units arranged within tread expanding member 24 to transmit heat through tread engaging surface 26, or after the treaded carcass has been removed from the tread ring expansion assembly.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method for mounting a ring tread onto a tire carcass, the method comprising the steps of:
   providing a tire tread ring comprising a tire tread having a radial thickness and lateral width extending between opposing side edges, the tread extending lengthwise to form a closed loop;
   arranging the tread ring in an initial ring arrangement in communication with a pressure source, the pressure source being in communication with an outer side of the tread ring;
   expanding the tread ring radially outward from the initial ring arrangement to an expanded arrangement, the tread ring being expanded by applying vacuum pressure along the outer side of the tread ring supplied by the pressure source;
   inserting a tire carcass within a central opening of the tread ring while in the expanded arrangement;
   contracting the tread ring into an installed arrangement about an outer surface of the tire carcass; and,
   releasing the vacuum along the outer side of the tread ring.

2. The method of claim 1, wherein the step of arranging the tread ring in the initial ring arrangement includes engaging each side edge with a side wall of an annular pressurization chamber, the side walls being spaced apart by a variable distance and the pressurization chamber being arranged along the outer side of the tread ring and being in communication with the vacuum pressure supplied by the pressure source.

3. The method of claim 2, wherein the step of arranging the tread ring in the initial ring arrangement includes inserting the tread ring into a tread ring-receiving cavity of a tread ring-expansion assembly having:
   the tread ring-receiving cavity configured to receive the tread ring and a tire carcass-receiving cavity configured to receive the tire carcass, the tire carcass-receiving cavity arranged radially inward of the tread ring-receiving cavity;
   a plurality of tread expanding members having tread receiving surfaces, the tread expanding members being arranged in an annular arrangement radially outward the tread ring-retaining cavity and configured to translate outward in a radial direction relative to the tread ring-receiving cavity from a tread engaging arrangement to a tread expanding arrangement while the tread ring is under vacuum pressure, the tread receiving surfaces being configured to contact the tread in the tread engaging arrangement prior to and during translation to the tread expanding arrangement and the tread receiving surfaces being further arranged in fluid communication with the pressure source in both the tread engaging and the tread expanding arrangements;
   a first side wall and a second side wall arranged annularly on opposing sides of the plurality of tread expanding members and the tread ring-receiving cavity, the first and second side walls extending radially relative to the tread ring-receiving cavity and being configured to engage side edges of the tread ring when arranged within the tread ring-receiving cavity and to maintain engagement with the side edges of the tread ring during tread ring expansion; and,
   means for translating the plurality of tread expanding members between the tread engaging and tread expanding arrangements, the means for translating being further configured to expand the tread with translation of the plurality of tread expanding members from the tread engaging arrangement to the tread expanding arrangement.

4. The method of claim 2, wherein the step of expanding the tread ring includes sliding each side edge along the corresponding side wall of the annular pressurization chamber, wherein the variable distance between the side walls decreases as the tread ring expands.

5. The method of claim 2, wherein a radially inward portion of at least one of the side walls is displaceable away from the tread ring and engages a corresponding tread ring side edge when the tread ring is arranged in the initial ring arrangement, where after the tread ring is expanded in the step of expanding, the radially inward portion of the side wall is displaced away from the tread ring to provide clearance for receiving the tire carcass in the step of inserting the tire carcass within the central opening of the expanded tread ring.

6. The method of claim 5, where the radially inward portion forms a translatable ring.

7. The method of claim 6, wherein the translatable ring expands in both a radial and axial direction relative the tread ring.

8. The method of claim 7, where the translatable ring comprises a plurality of segments arranged in an annular arrangement.

9. The method of claim 1, wherein the step of arranging the tread ring in the initial ring arrangement includes engaging the outer side of the tread ring with a tread receiving surface of a tread expanding member, the tread receiving surface being in communication with the vacuum pressure supplied by the pressure source and translatable in a radial direction relative to the tread ring.

10. The method of claim 3, where each of the tread receiving surfaces includes one or more protrusions configured to mate with a corresponding portion of the tread ring.

11. The method of claim 3, where the tread expanding members translate in a radial direction separately from the first and second side walls.

\* \* \* \* \*